(12) United States Patent
Hose

(10) Patent No.: US 11,619,833 B2
(45) Date of Patent: Apr. 4, 2023

(54) SYSTEMS AND METHODS FOR OPTICALLY FILTERING FOR COLOR SPECIFIC ENHANCEMENT

(71) Applicant: Hose, LLC, Huntsville, AL (US)

(72) Inventor: Mark D. Hose, Huntsville, AL (US)

(73) Assignee: Hose, LLC, Huntsville, AL (US)

( * ) Notice: Subject to any disclaimer, the term of this patent is extended or adjusted under 35 U.S.C. 154(b) by 72 days.

(21) Appl. No.: 16/983,048

(22) Filed: Aug. 3, 2020

(65) Prior Publication Data
US 2021/0055576 A1 Feb. 25, 2021

Related U.S. Application Data

(63) Continuation-in-part of application No. 16/290,932, filed on Mar. 3, 2019.

(60) Provisional application No. 62/638,079, filed on Mar. 3, 2018.

(51) Int. Cl.
*G02C 7/10* (2006.01)
*G02B 5/22* (2006.01)

(52) U.S. Cl.
CPC ............. *G02C 7/104* (2013.01); *G02B 5/226* (2013.01); *G02C 7/108* (2013.01)

(58) Field of Classification Search
CPC ......... G02B 5/226; G02C 7/104; G02C 7/108
USPC ..................................... 351/159.65
See application file for complete search history.

(56) References Cited

U.S. PATENT DOCUMENTS 9,410,879 B1 * 8/2016 Hose ..................... G01N 21/255
2014/0233105 A1 * 8/2014 Schmeder ............. G02B 5/285
359/590

FOREIGN PATENT DOCUMENTS

GB 2284679 A * 6/1995 ............. A61F 9/022

* cited by examiner

*Primary Examiner* — Joseph P Martinez
*Assistant Examiner* — Mitchell T Oestreich
(74) *Attorney, Agent, or Firm* — Dennen IP Law, LLC

(57) ABSTRACT

An optical filtering apparatus fashioned as a pair of glasses; that enhance the contrast and visibility of objects with specified colors. A set of distinct attenuations are combined to produce an optical filter that promotes a specified color.

20 Claims, 26 Drawing Sheets

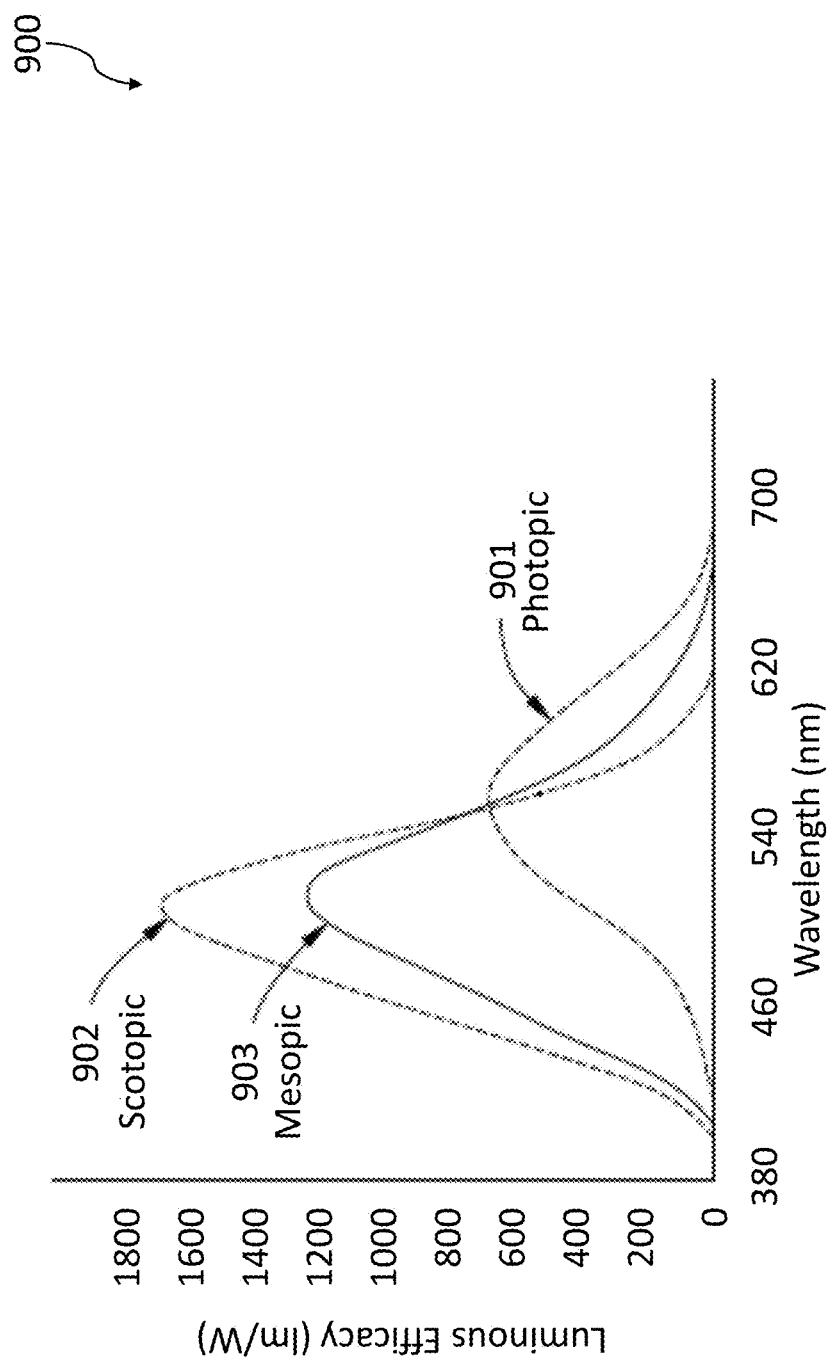

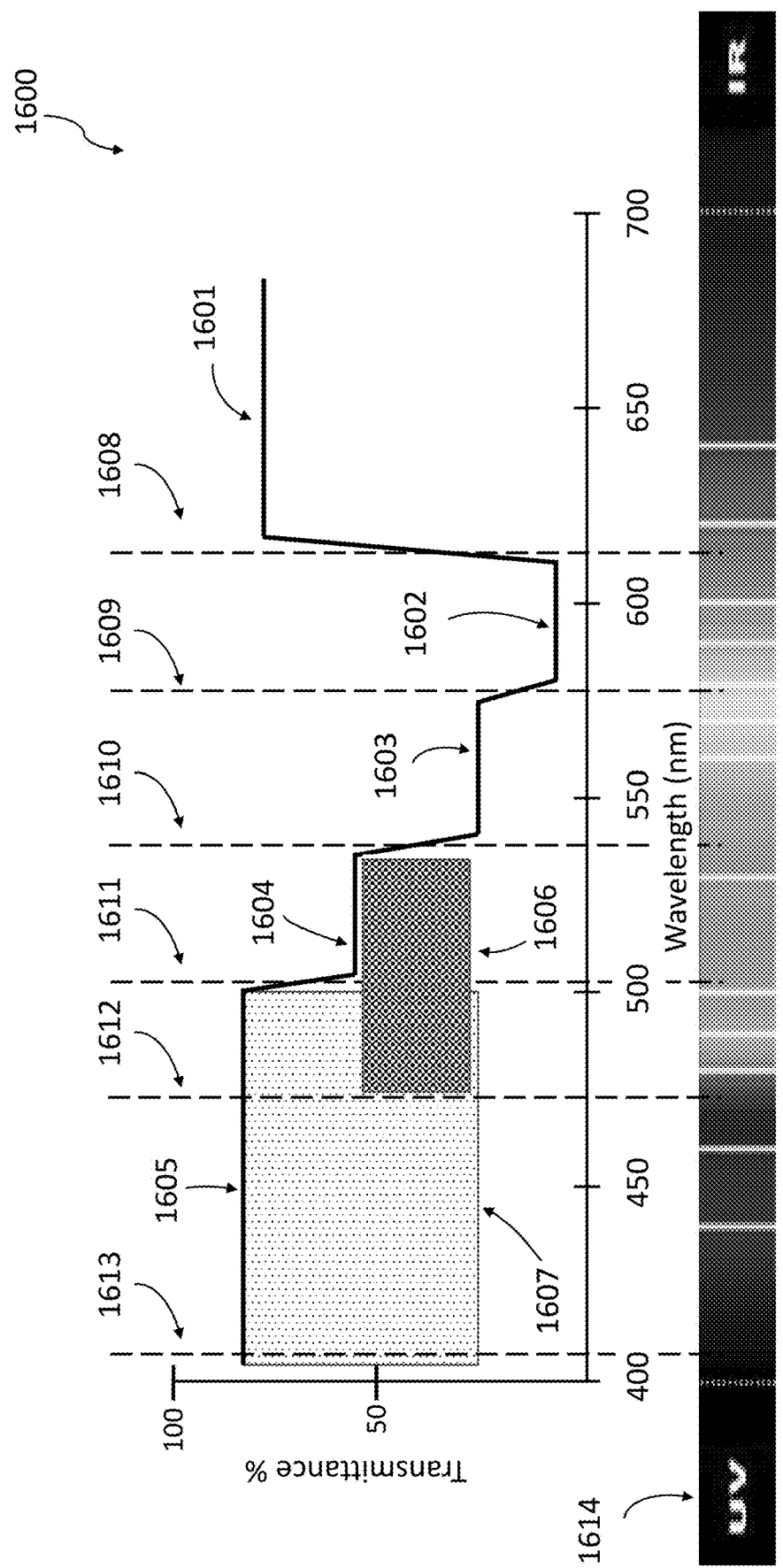

SYSTEMS AND METHODS FOR OPTICALLY FILTERING FOR COLOR SPECIFIC ENHANCEMENT

CROSS-REFERENCE TO RELATED APPLICATIONS

The present application claims priority to U.S. patent application Ser. No. 16/290,932 entitled Blood Trailing Eyewear and filed on Mar. 3, 2019, which claims priority to U.S. Provisional Patent Application Ser. No. 62/638,079 entitled Blood Trailing Eyewear and filed on Mar. 3, 2018, both of which are incorporated herein by reference.

BACKGROUND

The present disclosure relates to a method of optical filtration and to lenses employing the optical filtration. This optical filtration enhances the visibility of objects that exhibit specified colors.

Sportsmen are often required to track colored objects. Hunters track blood-trails that are predominately red in color; while competitive shooters track flying clay discs that are commonly orange in color.

Regarding blood-trails, hunters spend considerable time recovering game that have been shot. When the game runs away their blood-trails can become increasingly faint to non-existent. During daytime, recovery of the blood-trail is observed in the presence of natural sunlight. During nighttime, recovery of the blood-trail is illuminated with an artificial light source (e.g. flashlight or lantern). Hunters know that the blood-trail can come down to a single drop of blood; which can mean the difference in a lost animal or a found trophy.

Regarding shotgun shooting events like skeet, trap, and sporting clays; shooters must quickly identify flying colored clay discs and shoot them before they hit the ground. Shooter success is tied to their ability to quickly identify the target objects and to maintain track of these objects amid a variety of backgrounds and lighting conditions. Background conditions include sky, trees, and hillsides. Lighting conditions range from bright daylight to late afternoon with overcast clouds.

Often Shooters wear protective glasses and as such have a variety of commercial lenses from which to choose. Some of these commercial lenses provide simple colored tinting while other lenses offer complex manipulations of the visible light spectrum (notches, windows, dips). Since most all shooting events are held outdoors, glasses with partial shading (sunglasses) are often used. Tinted lenses can provide the shading effect but sometimes create an altered reality whereby the visual scenes take on the colored tint. For example, popular yellow tinted lenses used by shooters create visual scenes in which everything takes on the yellow tint while providing no significant increase in visibility of the colored discs.

SUMMARY

To overcome the shortcomings of the current art, an optical filtering apparatus is provided. And as such this apparatus employs a set of distinct and purposeful optical attenuations that are combined to form an optical filter that improves the visibility of objects with specified colors. This set of optical attenuations is described in terms of three categories: global, local, and color-balance. The global attenuations consist of an initial attenuation of all wavelengths of visible light for the purpose of a general shading effect (sunglasses). An additional global attenuation is applied across the visible spectrum to attenuate those wavelengths of light that are not significantly contributing to the color of the target object. A local attenuation is applied to a set of wavelengths near those wavelengths that are significantly contributing to the color of the target object. A color-balance attenuation is application specific and determines the amount of color balance that is applied to the background (visual scene).

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views. The present disclosure contains at least one drawing executed in color. Copies of this patent or patent application publication with color drawing(s) will be provided by the United States Patent and Trademark Office (USPTO) upon request and payment of the necessary fee.

FIG. 9 is a graph illustrating the photopic, scotopic, and mesopic responses of human vision.

FIG. 16A is a graph illustrating global, local, and color-balance attenuations applied for blood-trailing applications.

DETAILED DESCRIPTION

Figure 1:
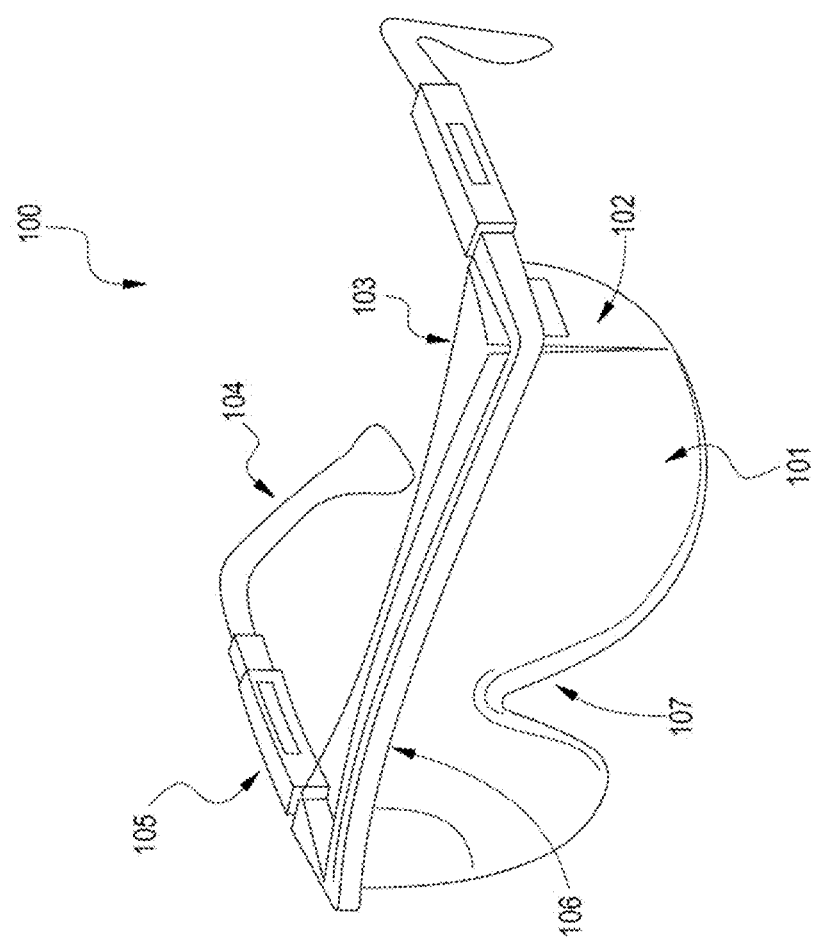
FIG. 1 is exemplary eyewear in accordance with an embodiment of the present disclosure.

The present disclosure provides lenses that improve the visibility of colored objects like blood-trails and orange clay discs. For blood-trailing applications, the present disclosure describes lenses that effectively improve the visibility of blood-trails during daytime recovery while in the presence of natural sunlight; and lenses that are equally effective during nighttime recovery in the presence of artificial light (flashlights, lanterns). For competitive shooting applications, the present disclosure describes lenses that improve the visibility of the colored clay discs amid a variety of backgrounds and lighting conditions while preserving color-balance of the backgrounds (visual scenes).

The present disclosure describes an optical filtering apparatus that can be worn by a sportsman as a pair of glasses (eyewear), and these glasses improve the visibility of objects with specified colors. Sportsmen are often required to track colored objects. For example, hunters track blood-trails while competitive shooters track flying colored clay discs. The apparatus combines certain properties of color processing found in human vision with optical properties of the colored objects. A set of distinct and purposeful attenuations are combined to create an optical filter that improves the visibility of certain colored objects like animal blood and orange clay discs.

In one embodiment the apparatus comprises a set of optical attenuations that are categorized as global, local, and color-balance. The global attenuations consist of an initial attenuation of all wavelengths of visible light for the purpose of a general shading effect similar to sunglasses. An additional global attenuation is applied across the visible light spectrum to attenuate those wavelengths of light that are not significantly contributing to the color of the target object. This effectively suppresses other colors and gives preference to the specified color of interest.

A local attenuation is applied to a set of wavelengths near those wavelengths that are significantly contributing to the color of the target object. The width of the local attenuation is relatively small while the amount of attenuation across this window is significantly high. In one embodiment the width of the local attenuation is approximately 34 nm but can sometimes be closer to 45 nm. In this embodiment the local attenuation level is approximately 99 percent yielding a corresponding transmittance of 1 percent. The local attenuation creates a color-shift effect that provides a dramatic improvement to the visibility of certain colored objects like animal blood and orange clay discs. Color-shift refers to an effect where a colored object appears to take on a different color once filtered. In one embodiment the local attenuation applied to a dull orange object makes the object appear deep orange and almost red (i.e. color-shifted from orange to red).

A color-balance attenuation is applied but is recognized to be application specific. The color-balance attenuation determines the amount of color balance that is applied to the background visual scenes. The color-balance attenuation is applied in concert with the afore-mentioned global and local attenuations to collectively produce a composite spectrum. The color-balance attenuation is applied to preserve the increased contrast of the specified colored object due to the global and local attenuations; while leveling out the other colors in the background scenes so that they appear natural and seemingly unaltered.

The color-balance attenuation is application specific. For shooting applications involving orange clay discs, the color balance is optimized to allow the background scenes to be observed as natural, virtually unmodified, and largely unfiltered. For blood-trailing applications, the color-balance is relaxed to pass more light in order to compensate for use in low-lighting conditions such as nighttime game recovery using limited artificial light like a flashlight or a lantern.

With reference first to FIG. 1, an exemplary eyewear apparatus 100 as illustrated comprises an impact resistant lens(es) 101 possessing the aforementioned optical filtration properties. Included are side shield(s) 102 and a top shield 103. The side shield(s) 102 and top shield 103 help block light coming in from the sides and top; which helps to apply filtering to most all of the light reaching the wearer's eyes. The side shield(s) 102 and top shield 103 can also be constructed as solid plastic to block light entering from the top and sides, or the side shield(s) 102 and the top shield 103 may be opaque to reduce light entering from the top and sides. In one embodiment, the shield(s) 102 and the top shield 103 may be made of the lens 101 filter material to selectively filter the light from multiple directions.

The eyewear includes arms 104 with adjustments 105, an optional frame 106, and a nose bridge 107. These are standard components of traditional safety glasses, but the lens(es) are specially designed to enhance specific colors (e.g. red and orange).

Figure 2:
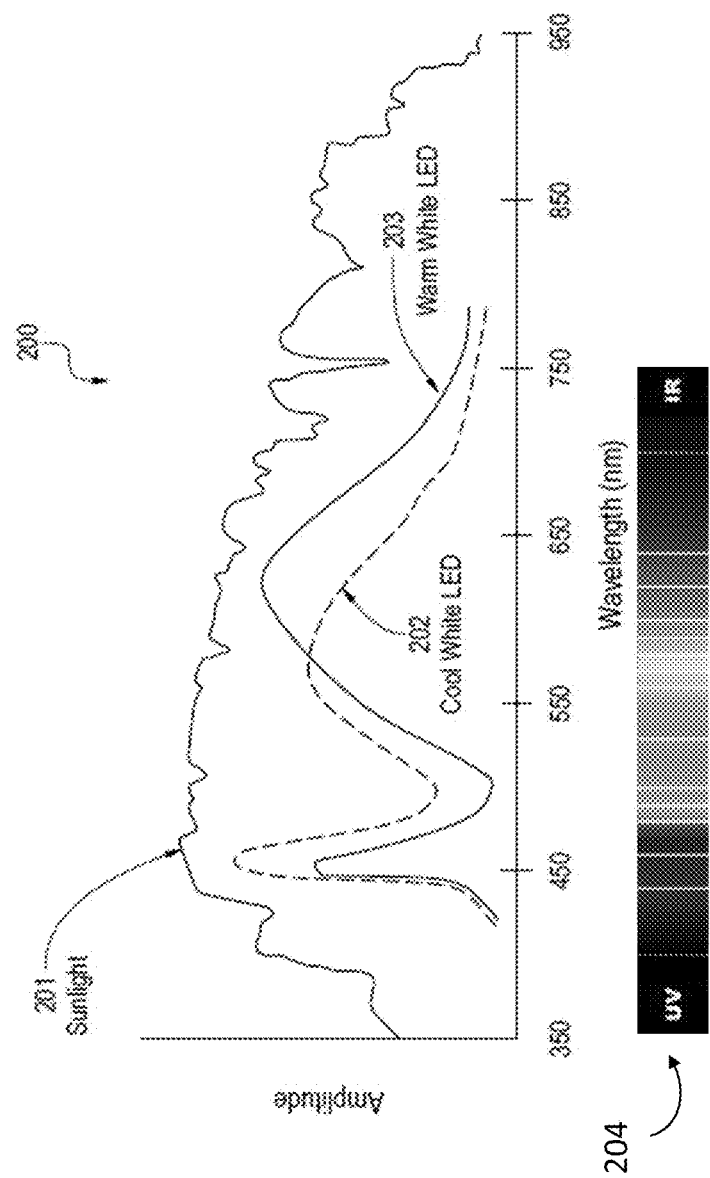
FIG. 2 is a graph showing light spectrums for artificial (LEDs) and natural (sunlight) light sources; and includes an illustration of the colors of the visible light spectrum.

FIG. 2 compares the light spectrums for artificial light sources (cool white LEDs shown by graph 202 and warm white LEDs shown by graph 203) with natural light sources (sunlight shown by graph 201). It is understood that natural sunlight is many times brighter than LEDs so, the curves 200 are scaled for relative comparison of their spectral distributions. White LEDs have a dominant blue contributor in or around 450 nm. White LEDs also have a somewhat gaussian distribution of intensity between 500 nm and 750 nm. Sunlight on the other hand has a smoother, somewhat flat, distribution between 450 nm and 750 nm. The eyewear described herein filters natural sunlight 201 during daytime applications like blood-trailing and shooting clay discs and filters artificial light, e.g., LED flashlight 202 and 203, during nighttime applications.

The visible light spectrum 204 is generally considered to span wavelengths between 360 nm and 830 nm for daylight levels of illumination. While the human eye sees wavelengths across this entire range the span is effectively limited to a range of 400 nm to 700 nm under normal viewing conditions.

Sunlight is distributed across the spectrum and can be decomposed into specific colors that result from the particular wavelengths of light. However, objects whether natural or man-made, are not resigned to a single specific wavelength or wavelength-color, but instead relate to combinations of wavelengths. For example, an orange object does not consist of simply a 600 nm wavelength of light but instead consists of a group of wavelengths that may include red, orange, and yellow wavelengths. Again, an object observed by a human does not consist of a single color wavelength but instead consists of groups of color wavelengths that are processed by the eye and brain (also known as color perception).

Figure 3:
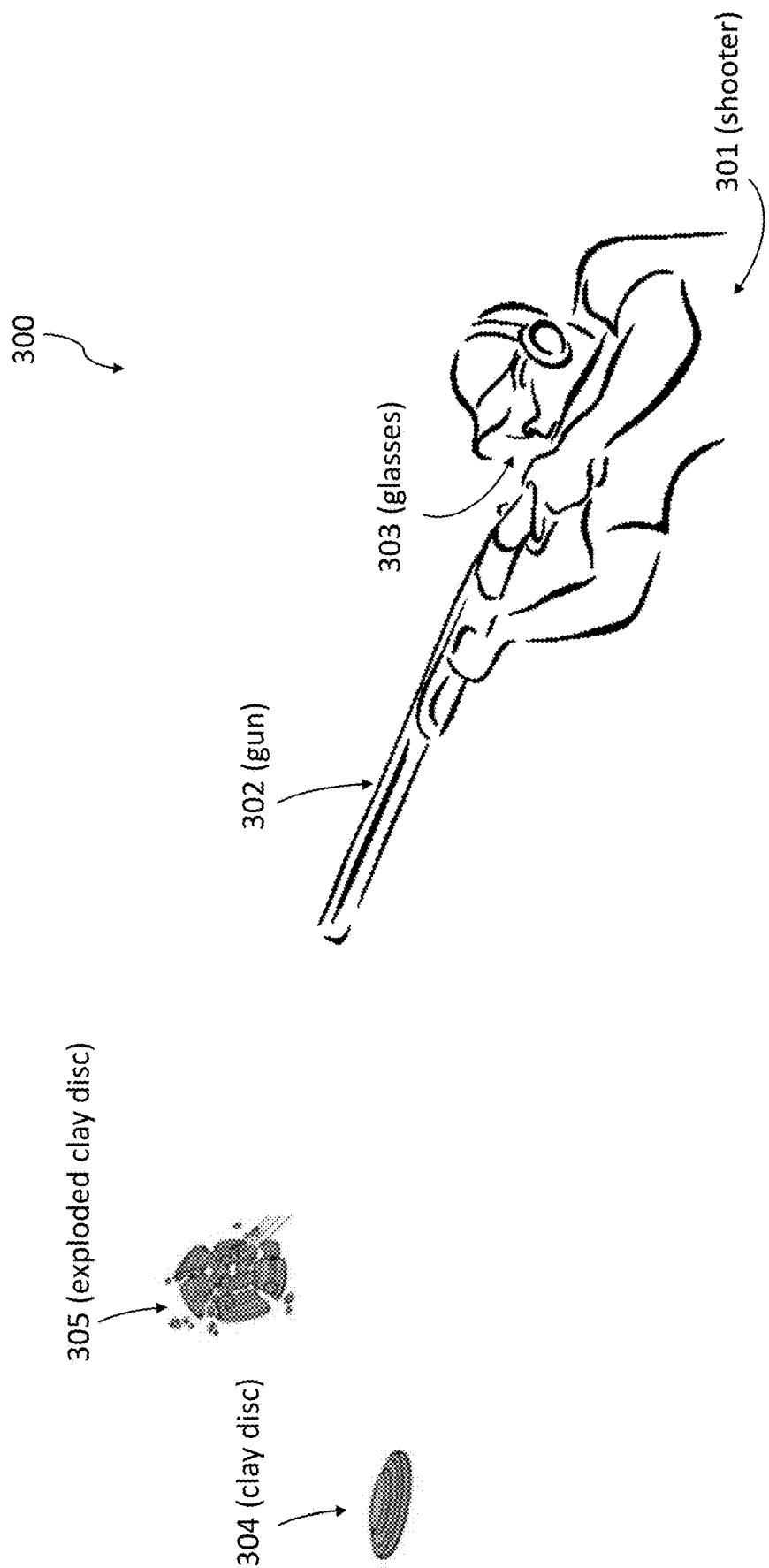
FIG. 3 shows a sportsman wearing the exemplary eyewear shown in FIG. 1 while shooting colored clay discs.

Regarding shotgun shooting applications, the apparatus of the present disclosure improves the visibility of colored clay discs. These objects are often referred to as clays or skeet. With reference to FIG. 3, there are three major shotgun sporting events—trap, skeet, and sporting clays. Trap has clay targets moving away from the shooter, while skeet has them crossing from side to side. In sporting clays, targets can fly in multiple directions. Protective eyewear is required for these events. Shooters 301 must quickly acquire and track these flying colored objects 304 and shoot the clay disc 305 with a shotgun 302 before they hit the ground. The clay discs are most commonly bright orange in color. However, other disc colors such as white, black, and yellow (sometimes with an occasional black outer ring) are used. But a popular fluorescent orange color has been overwhelmingly adopted as it provides additional brightness in the presence of ultraviolet (UV) sunlight.

Shooters have to contend with a variety of background environments and lighting conditions. Background environments include clear sky, cloudy sky, trees of various colored foliage, hillsides and ground cover of various colors. Lighting conditions can vary between clear bright daylight and overcast late afternoon.

Figure 4:
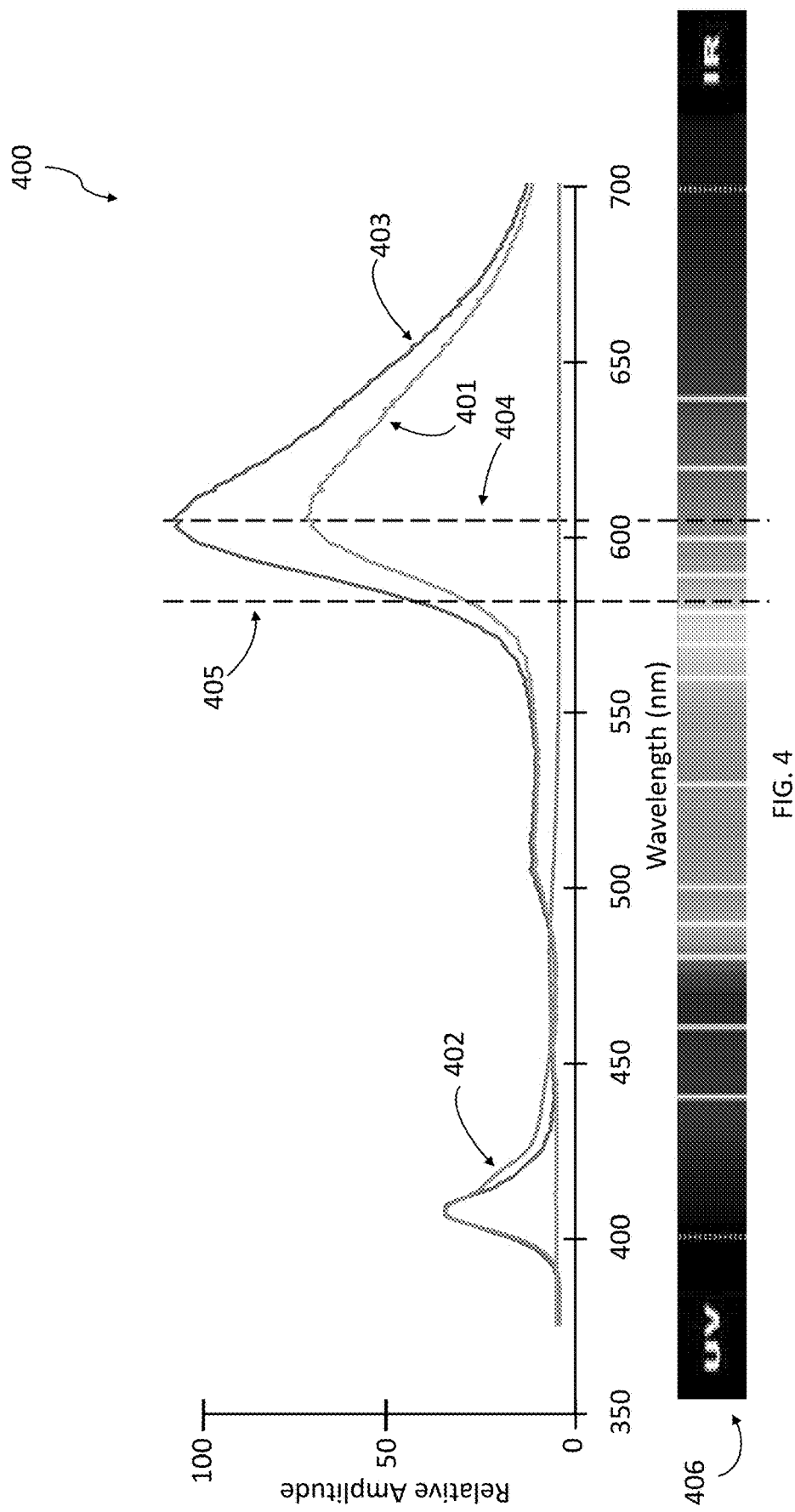
FIG. 4 is a graph showing the spectral response of a fluorescent orange clay disc (skeet) while illuminated with and without ultraviolet lighting.

FIG. 4 shows the spectral profile of an orange sporting clay disc. A popular fluorescent orange paint is used that provides additional intensity when exposed to ultraviolet light. This fluorescent paint has a normal spectral profile 401 when exposed to incandescent light. But when ultraviolet light shown by graph 402 is added, the spectral intensity is increased as shown by graph 403. Regardless of the light source the peak in the spectral profile of the fluorescent paint is near 605 nm shown by line 404 and diminishes significantly below 580 nm shown by line 405. The visible light spectrum 406 is included in this figure for reference.

Figure 5B:
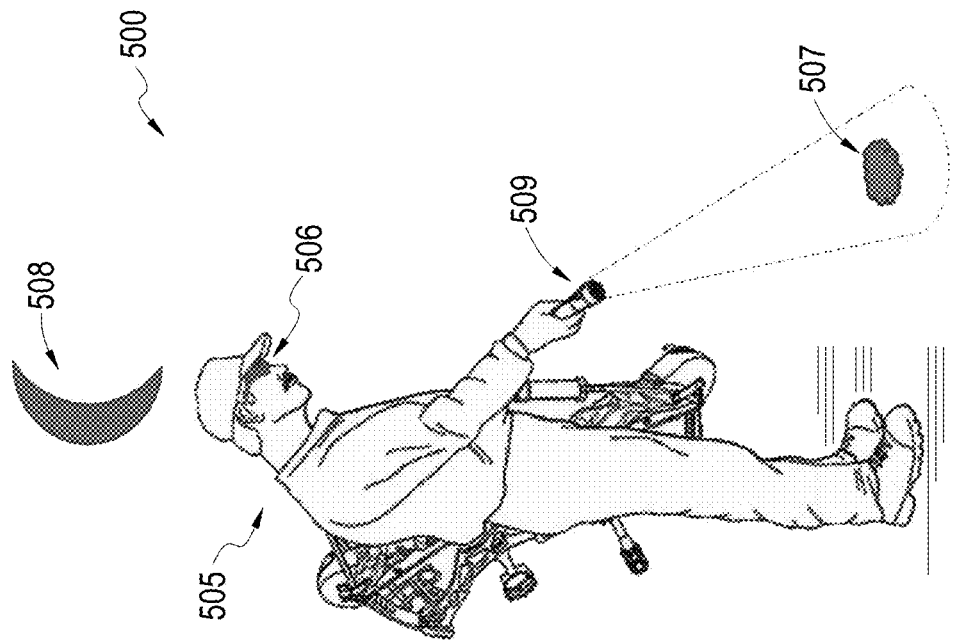
FIG. 5B shows a sportsman using the apparatus in FIG. 1 while tracking a blood-trail at nighttime with an artificial light (flashlight).
Figure 5A:
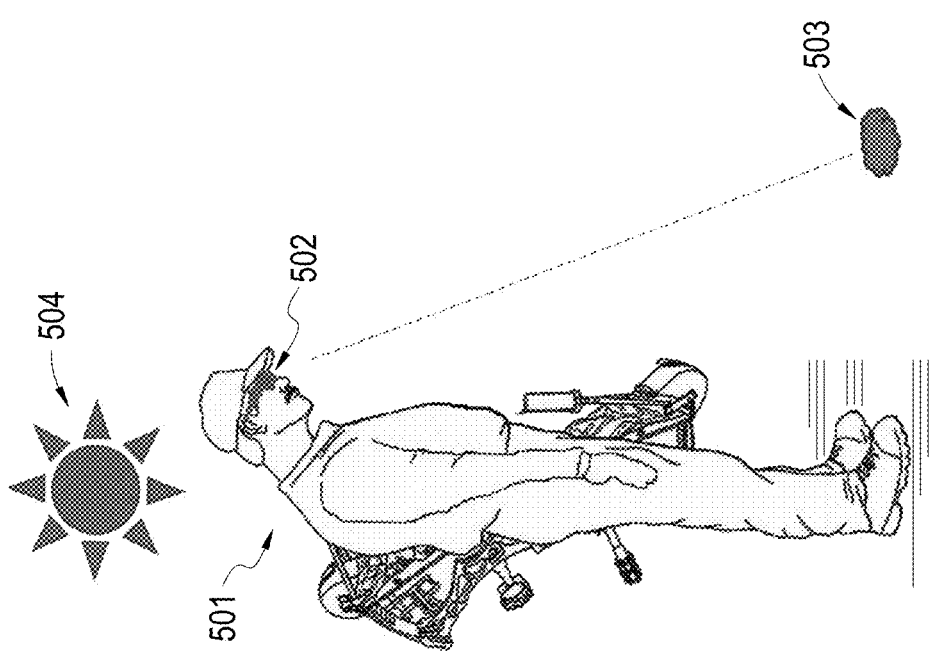
FIG. 5A shows a sportsman using the apparatus in FIG. 1 while tracking a blood-trail in the daylight.

Regarding blood-trails, the apparatus of the present disclosure improves the visibility of blood-trails. FIG. 5A depicts a hunter 501 using the apparatus 502 while tracking a blood-trail 503 in the presence of natural light (sunlight 504). FIG. 5B depicts a hunter 505 using the apparatus 506 while tracking a blood-trail 507 in a nighttime scenario with limited natural light (moonlight 508) but supplemented with artificial light (flashlight 509). In either case the optical filtering apparatus (glasses) 506 are used to increase the visibility of specified colored object (blood-trail).

The actual color of blood depends on several factors to include the oxygenation levels of the blood, the amount of time that the blood has existed outside of its host body, and environmental conditions (e.g. temperature and moisture).

Figure 6:
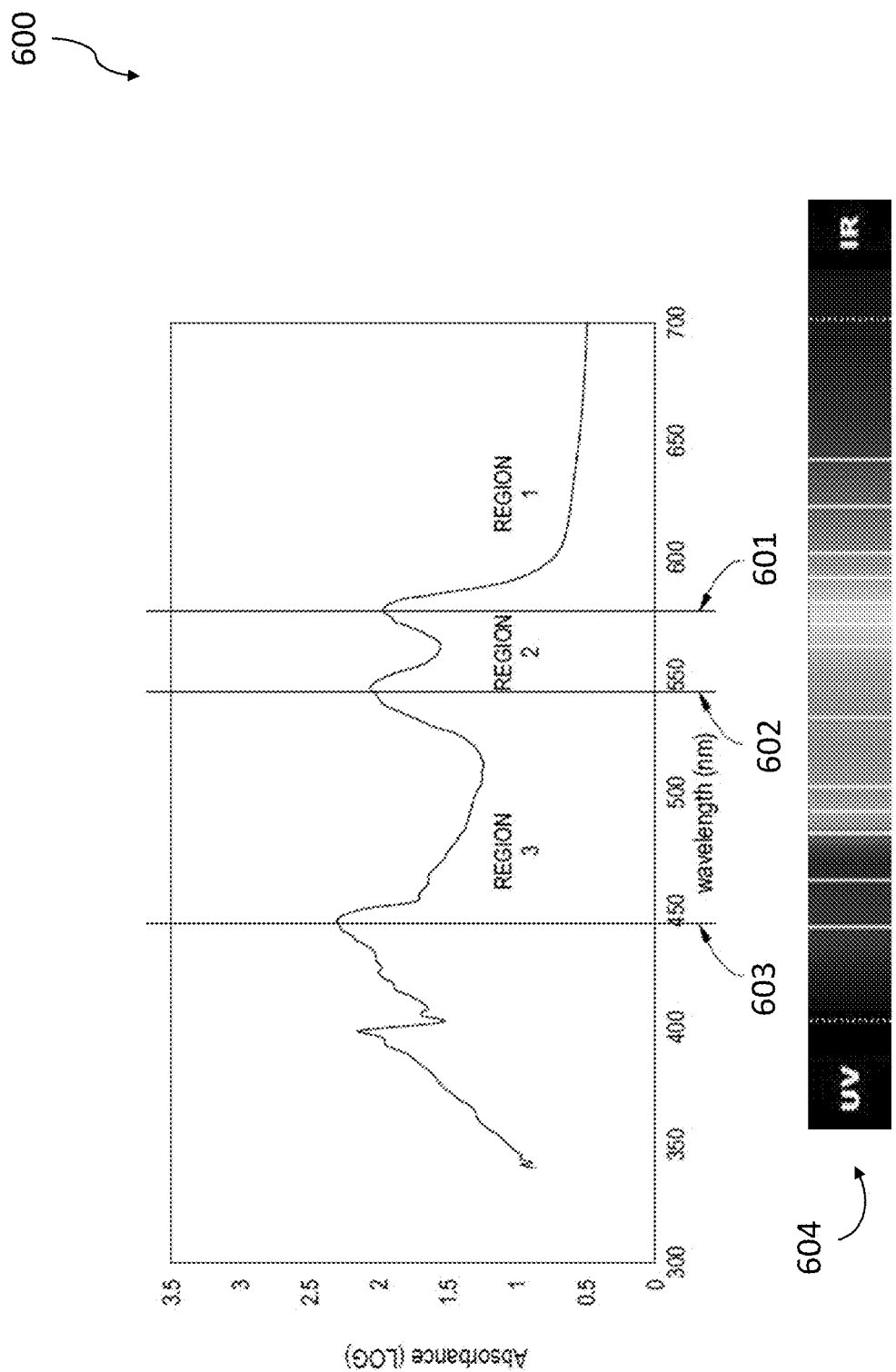
FIG. 6 is a graph showing the spectral absorbance of blood.

FIG. 6 shows an exemplary plot of the spectral absorbance of blood. The vertical peaks indicated by lines 601, 602, and 603 near 575 nm, 540 nm, and 440 nm, respectively, indicate areas in the visible light spectrum 604 where light wavelengths are predominately absorbed by the blood. It should be noted that this curve is plotted with a logarithmic scale, which enables one to see additional features that are not nearly as noticeable when plotted on a linear scale. FIG. 6 details three distinct regions (Region 1, Region 2, Region 3) that are separated by the absorption peaks indicated by lines 601, 602, 603. Wavelengths in Region 1 receive the least amount of absorption as compared to the amounts of absorption in Region 2 and Region 3. This relates to more of these wavelengths getting sent to the eye. Region 2 and Region 3 have noticeable valleys that relate to local minima for absorption. The relative proportions of the absorption in Region 1, Region 2, and Region 3 are significant as they define the optical properties of blood.

Figure 7:
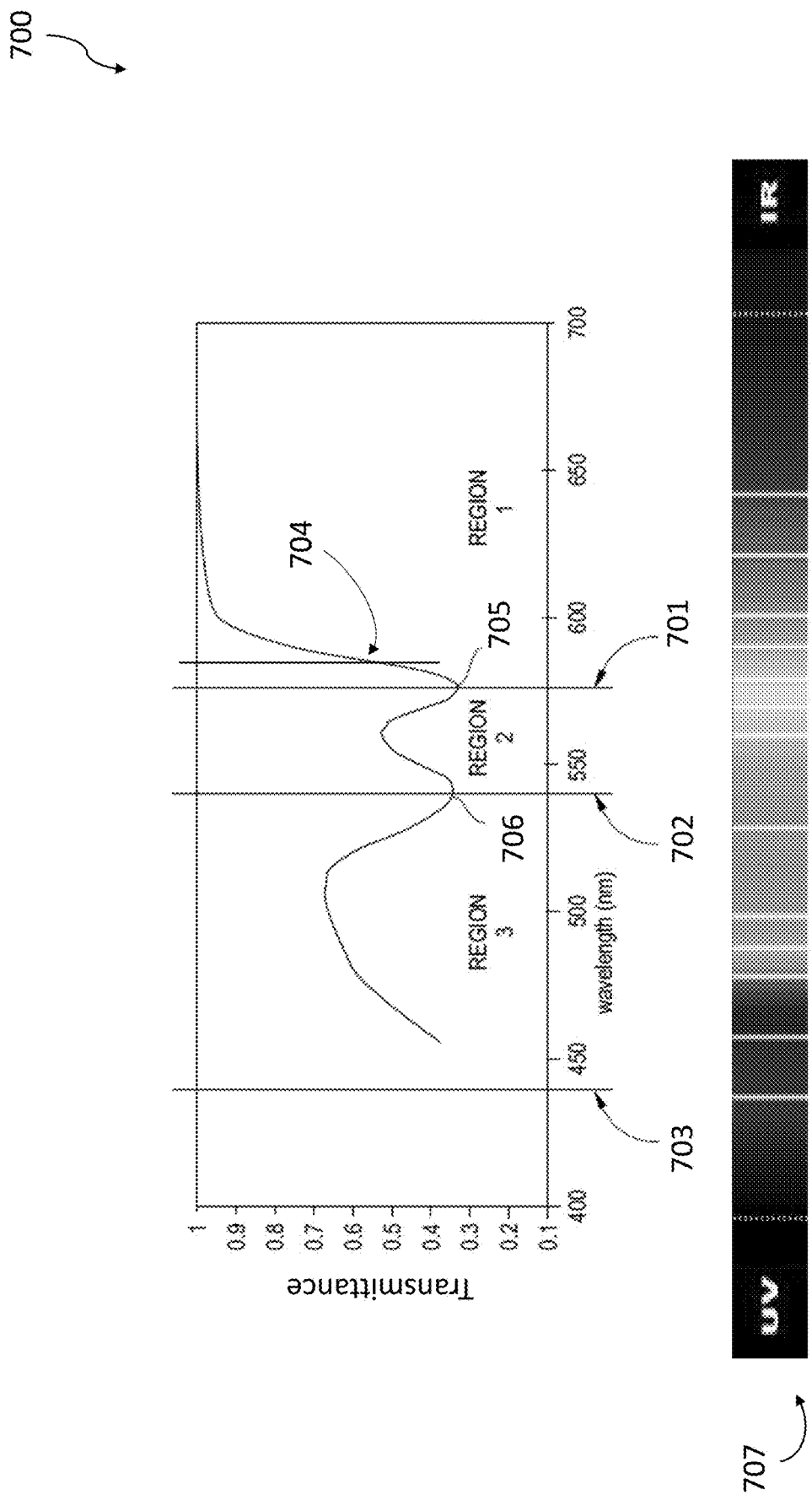
FIG. 7 is a graph showing the spectral transmittance of blood.

FIG. 7 shows an exemplary plot of the spectral transmittance of blood. This figure details three distinct regions (Region 1, Region 2, Region 3) bounded by wavelengths indicated by lines 701, 702, 703, corresponding to wavelengths near 575 nm, 540 nm, and 440 nm respectively, again indicating areas in the visible light spectrum 707 where light wavelengths are predominately absorbed by the blood. Region 1 contains wavelengths that are predominately red, and the transmittance for these wavelengths is significantly higher than those of the wavelengths in the other two regions. Region 3 contains wavelengths that are predominantly blue with some green and the peak amplitude of the hump in this region is significantly less than the peak amplitude of Region 1. Region 2 contains wavelengths that are predominately green and the peak amplitude of the hump in this region is less than the peak amplitude of Region 3.

In one embodiment the relative proportions of the peak amplitudes of Region 1, Region 2, and Region 3 of FIG. 7 can be carried forward in the creation of the filtration lenses. Narrow-band absorbers located at wavelengths between the three regions and one to the left of Region 3 can be integrated with the lens(es) to filter light and produce a filtered transmittance that mimics that of blood. That is to say that the resulting transmittance of the filter will resemble the transmittance of blood.

A narrow-band absorber can be added between the red and green regions 701 near 575 nm that absorbs light and produces a local minima 705. Another narrow-band absorber can be added between the green and blue regions 702 near 540 nm, and absorb light and produce a local minima 706. Another narrow-band absorber can be added near 440 nm indicated by line 703. The importance of the absorbers being narrow-band is that they are sufficiently narrow that their attenuation does not extend into the red region, because a goal is that the red region receives as little attenuation as possible. FIG. 7 also shows a threshold wavelength indicated by line 704 whereby the transmittance for all of the visible wavelengths above which are significantly higher than the transmittance for any of the visible wavelengths below the threshold wavelength indicated by line 704.

Figure 8B:
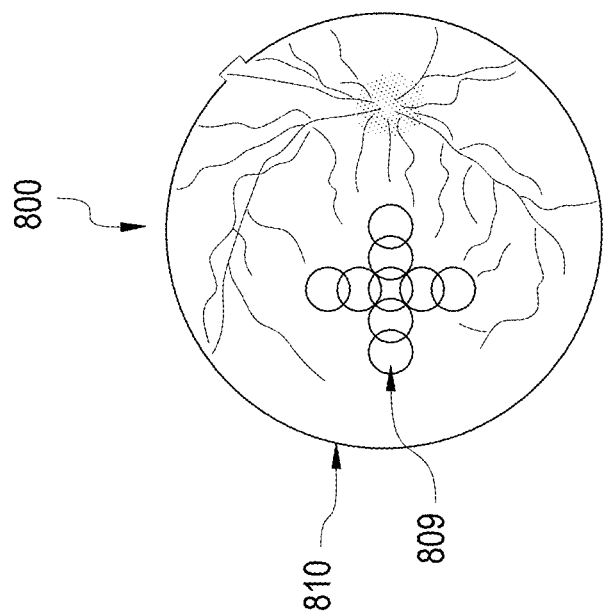
FIG. 8B illustrates the concept of overlapping receptive fields of the photoreceptors within the human eye.
Figure 8A:
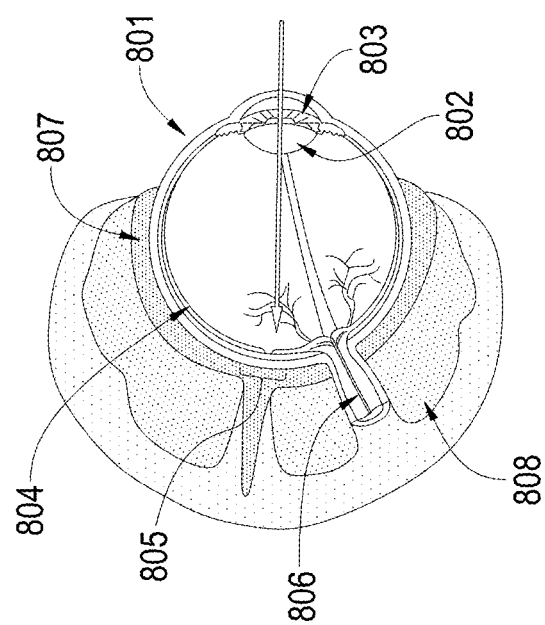
FIG. 8A shows a side view of the human eye detailing among other things the rod and cone photoreceptor densities.

FIG. 8A illustrates certain physical aspects of the human eye 801. Light enters thru a lens 802 and the amount of light is controlled by the iris 803. The light is focused onto the retina 804 which contains a variety of light-sensing photoreceptors. The eye has two primary types of light-sensing cells referred to as rods and cones. Their names refer to their actual geometric shapes. The retina has a small area referred to as the fovea 805 where the cone density 807 peaks and concentration of photoreceptors is exclusively cones. The distribution of rods 808 exists outside of the fovea and does however include a very small number of cones. The photoreceptors convert the light to impulses that are sent thru the optic nerve 806 to the brain for additional processing. FIG. 5B illustrates the concept of overlapping photoreceptor fields 809 withing the eye 810. Actual receptive field size is much smaller than shown.

FIG. 9 illustrates the response of the human eye in dark, near-dark, and daylight environments. Cones process visual information with a photopic response 901 in bright light (daytime). Rods process visual information with a scotopic response 902 in dark lighting conditions (nighttime). Between photopic and scotopic light levels is a range called mesopic. Mesopic response 903 exists in moderately low (but not dark) lighting conditions where the effectiveness of the cones is diminished; and rods strongly affect color perception by mixing with or tinting the color of the still active cones. As intimated by FIG. 9, human vision is vastly different in dark, near-dark, and daylight environments. The application of the apparatus described herein will relate primarily to the photopic and mesopic responses.

Figure 10:
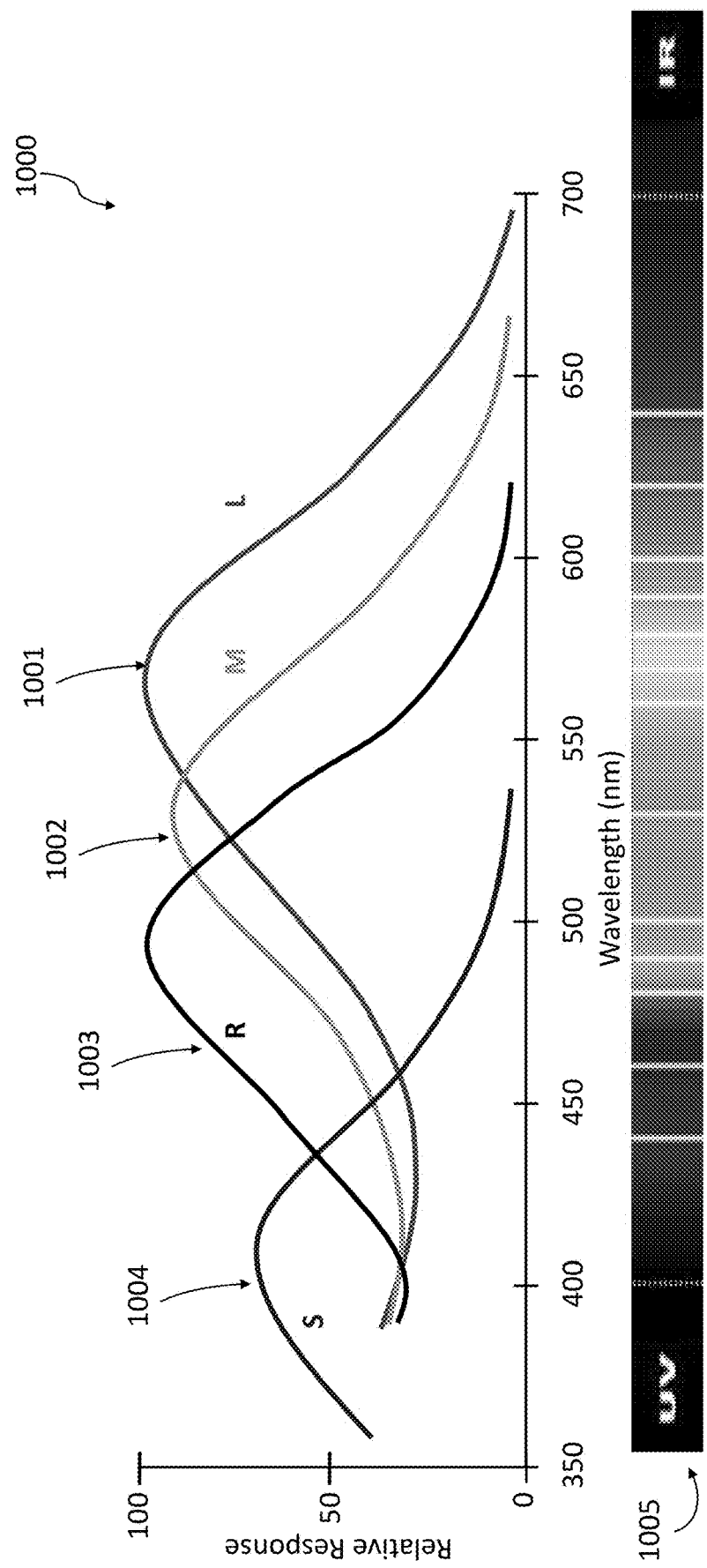
FIG. 10 is a graph illustrating the response curves for the rod and cone photoreceptors found in human vision.

FIG. 10 illustrates the responses of the four types of photoreceptors. Red-sensitive cones have a response curve 1001 showing particularly sensitive to longer wavelengths ("L") with a peak sensitivity at or near 560 nm. Green-sensitive cones have a response curve 1002 showing a sensitivity to medium wavelengths ("M") with a peak sensitivity at or near 530 nm. Blue-sensitive cones have a response curve 1004 showing a sensitivity to short wavelengths ("S") with a peak sensitivity at or near 420 nm. The rods have a response curve 1003 with a peak sensitivity near 500 nm. The visible light spectrum 1005 is included in this figure for reference.

There are two major theories for the color processing in human vision: Young-Helmholtz trichromatic theory and Hering color opponent process theory. These theories are complementary and together explain how humans process color. Trichromatic theory explains how color vision works at the receptor level, while color-opponent theory explains how it works at the neural level.

Figure 11:
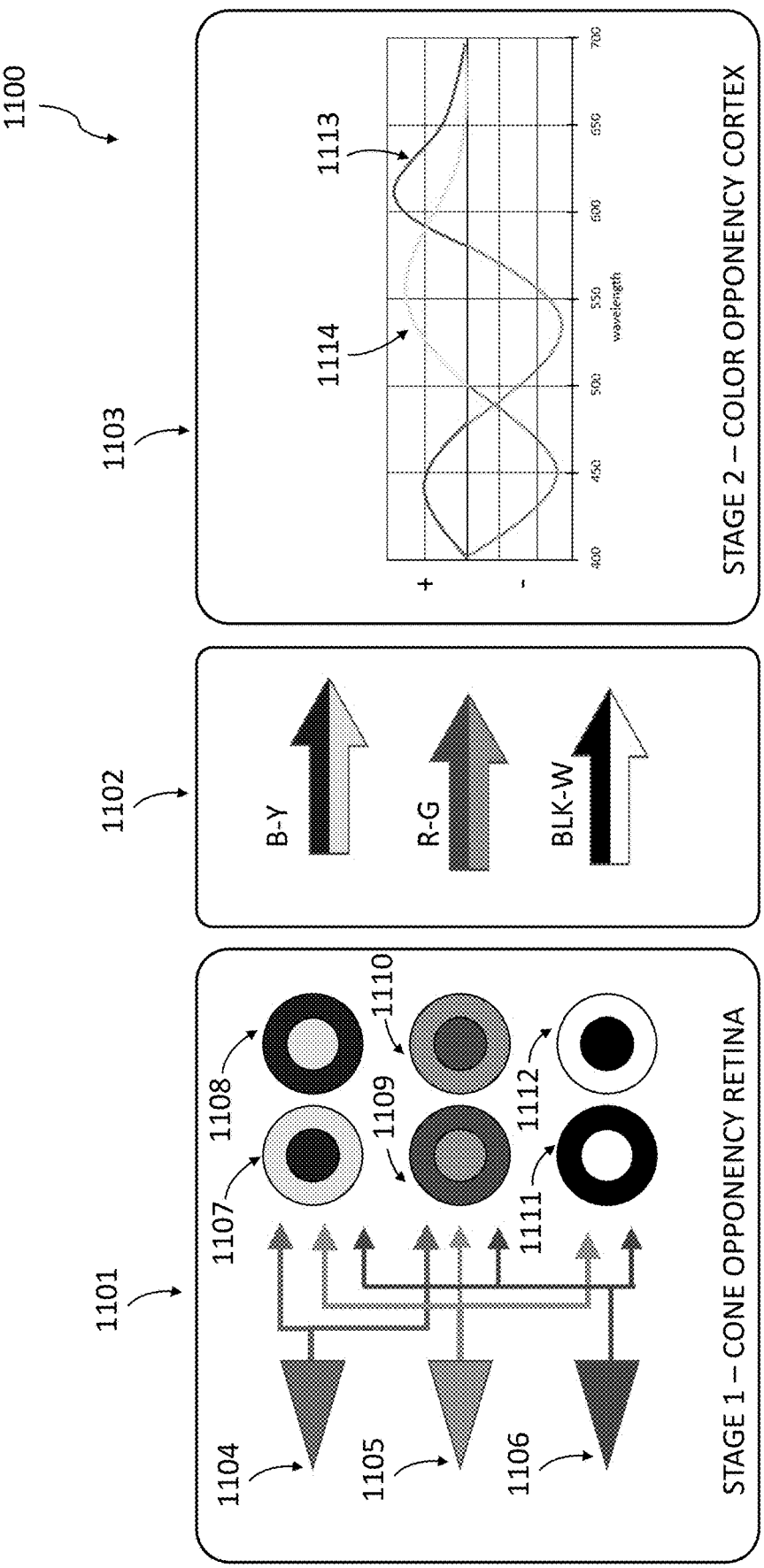
FIG. 11 illustrates color opponent theory in human vision with two stages of opponent processing (retinal and cortex).

FIG. 11 illustrates color processing that is associated with color opponent theory. A first stage of color processing 1101 occurs in the retina. The red 1106, green 1105, and blue 1104 sensitive cones are wired to produce color opponent pairs. The receptive fields 809 (FIG. 8) are configured into center and surround areas like bullseyes. The color opponent pairs include Red center/Green surround 1110, Green center/Red surround 1109, Blue center/Yellow surround 1107, and Yellow center/Blue surround 1108. There are also black versus white opponent pairs 1111 and 1112; but they do not affect our color sense. The color opponent channels 1102 from the retinal processing 1101 continue thru to a second stage of color processing 1103 occurring in the cortex. The B-Y (Blue-Yellow) opponent response curve 1114 shows that the blue side dominate for wavelengths below 500 nm while the yellow dominates at wavelengths above 500 nm. The R-G (Red-Green) opponent response curve 1113 shows the red dominating at each end while the green dominates in the middle. Every color is seen as a balance between these two channels. For example, looking at the two response curves 1113 and 1114 at 450 nm, the blue plus red sums to a specific blue.

Figure 12:
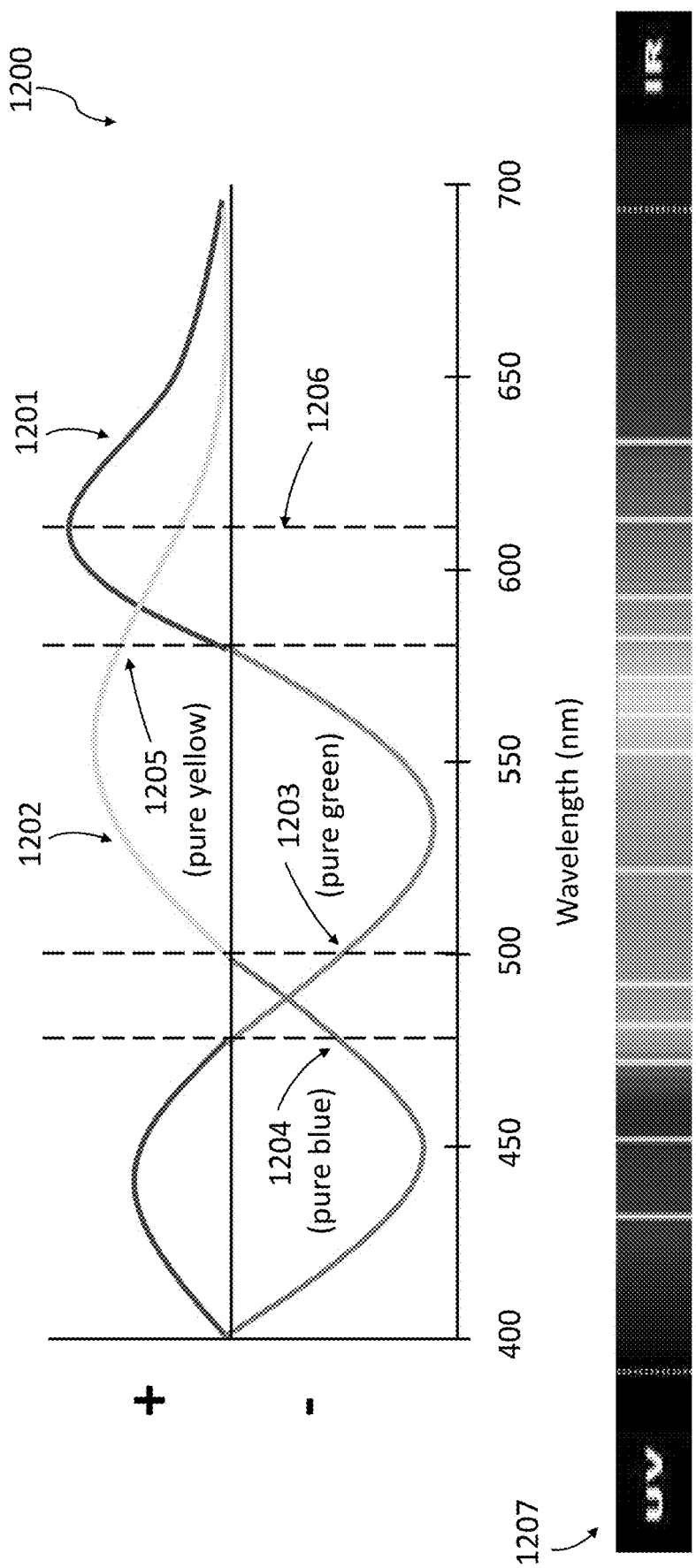
FIG. 12 is a graph of the R-G (Red-Green) and B-Y (Blue-Yellow) response curves of color opponency in human vision.

FIG. 12 provides additional explanation of the Red-Green 1201 and Blue-Yellow 1202 color opponent response curves. Humans perceive pure green 1203 around 500 nm where the B-Y (blue-yellow) cancel and green is unopposed. Pure blue 1204 is perceived near 477 nm where R-G (red-green) cancel and blue is unopposed. Pure yellow 1205 is perceived near 580 nm where R-G (red-green) cancel and yellow is unopposed. Unique red is non-trivial as it falls outside of the spectrum. A peak in the R-G response curve occurs near 614 nm indicated by line 1206; the importance of which will be discussed later. The R-G response curve 1201 has a peak near 614 nm. The visible light spectrum 1207 is included for reference.

Combining an understanding of the color processing that occurs in human vision with the knowledge of the spectral profiles of the colored objects (blood-trails and orange clay discs), allows an optical filter to be tailored to increase the contrast and visibility of an object with a specified color. A set of distinct attenuations are combined into an optical filter that manipulates the visible light spectrum for this purpose. This set of optical attenuations is now described in terms of three categories: global, local, and color-balance.

Figure 13:
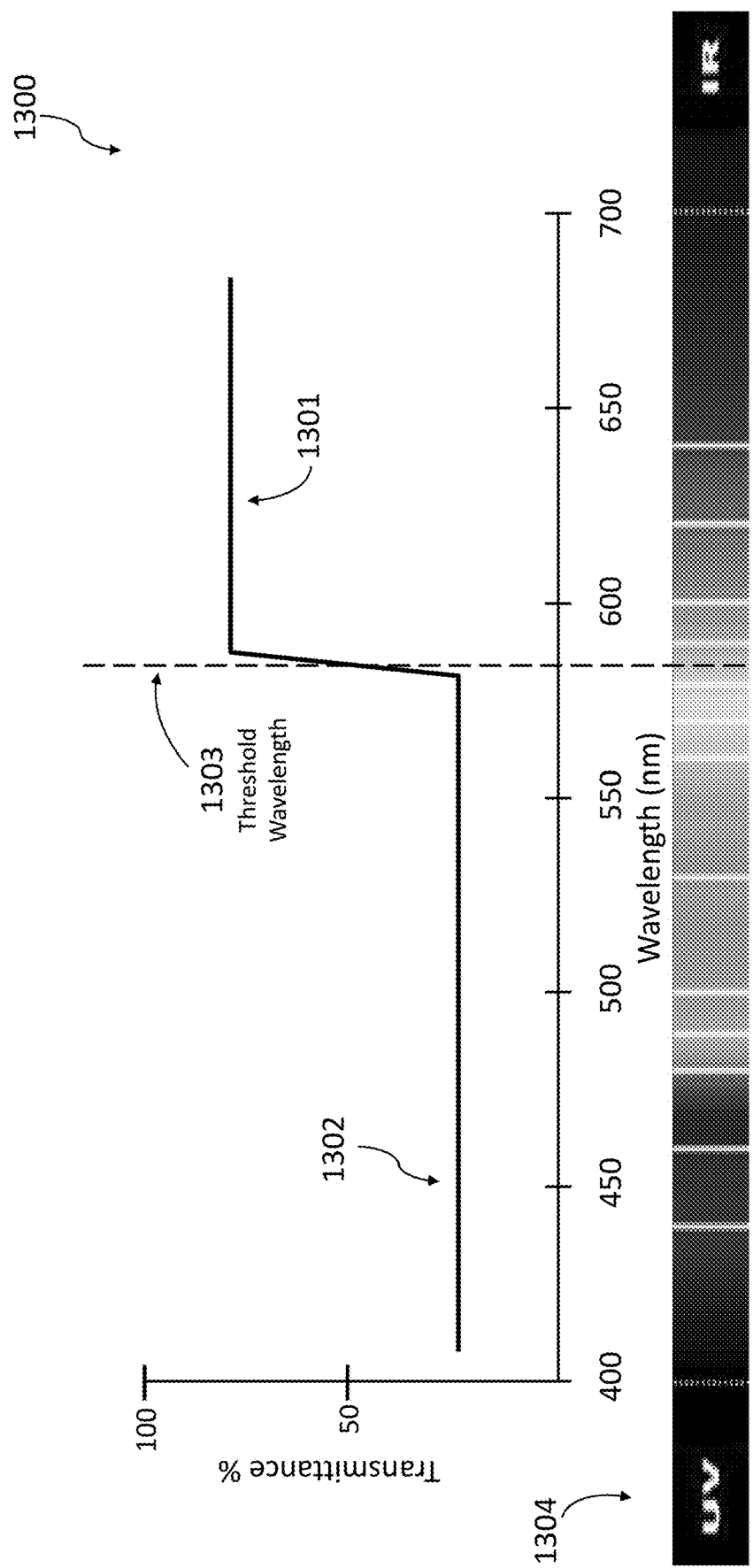
FIG. 13 is a graph illustrating global attenuations applied to the visible light spectrum.

FIG. 13 illustrates global attenuations to be applied to the visible light spectrum 1304. The global attenuations consist of an initial attenuation shown by line 1301 of all wavelengths of visible light for the purpose of a general shading effect, like sunglasses. An additional global attenuation 1302 is applied across the visible spectrum to attenuate those wavelengths of light that are not significantly contributing to the color of the target object. A threshold wavelength identified by line 1303 delineates these two global attenuations. The wavelength is near 590 nm for blood-trailing applications and near 580 nm for shooting applications involving orange clay discs. Wavelengths above the threshold wavelength indicated by line 1303 receive minimal attenuation as shown by line 1301 for general purpose shading effect (sunglasses), while wavelengths below the threshold wavelengths shown by line 1303 receive substantially more attenuation as shown by line 1302. In one embodiment the attenuation of wavelengths above the threshold wavelength 1303 is 20 percent yielding an average 80 percent transmittance shown by line 1301, and the attenuation of wavelengths below the threshold wavelength indicated by line 1303 is 75 percent yielding an average 25 percent transmittance shown by line 1302.

Figure 14:
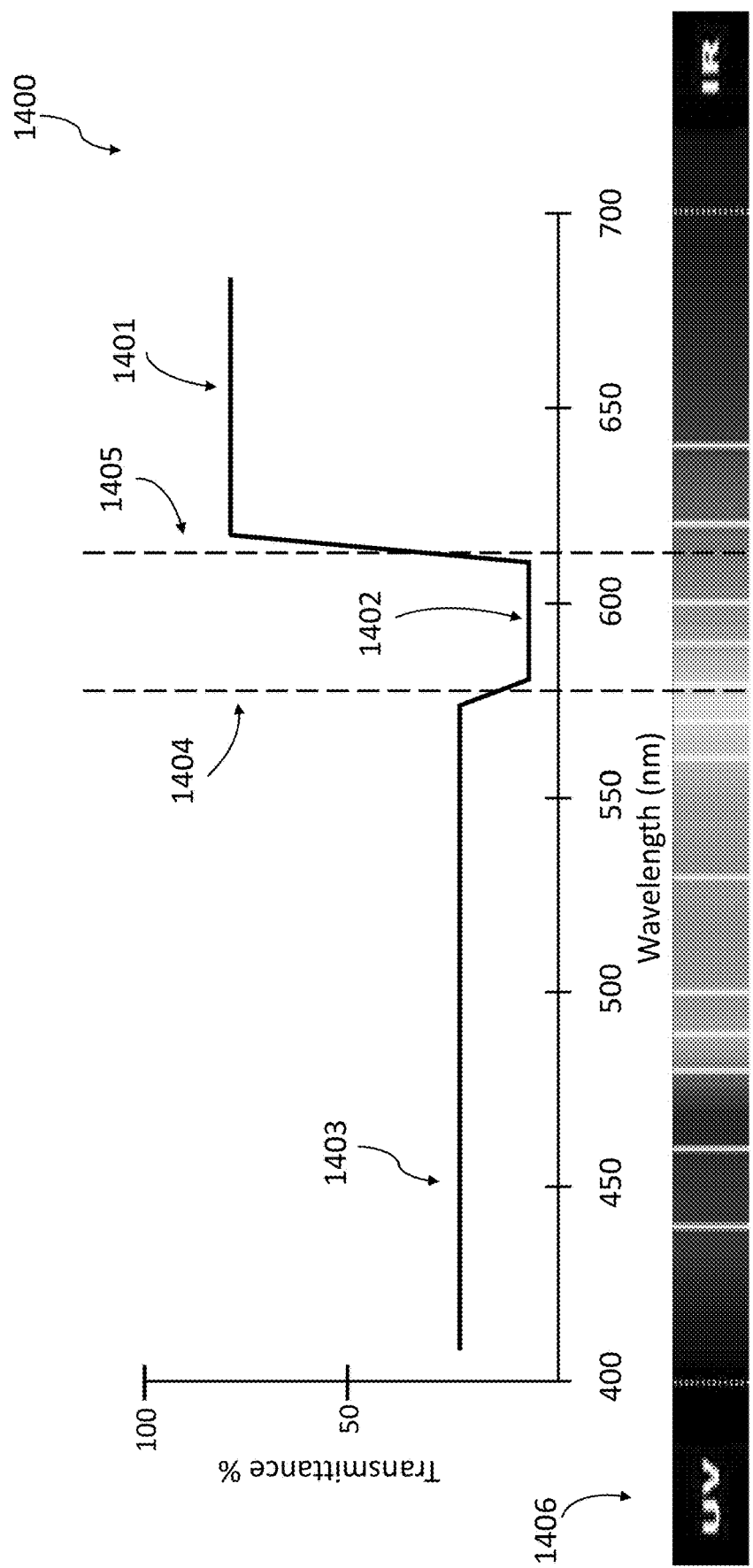
FIG. 14 is a graph illustrating global and local attenuations applied to the visible light spectrum.

FIG. 14 illustrates the addition of a second attenuation representing a local attenuation of wavelengths that are close to and below those wavelengths comprising the colored object. Wavelengths of light between line 1405 and line 1404 receive a significant "local" attenuation shown by line 1402 which is substantially stronger than the "global" attenuations shown by line 1401 and line 1403. Selecting a critical wavelength indicated by line 1405 that is above the threshold wavelength 1303 (FIG. 13) for the colored object, produces a color-shift effect that adds unmistakable improvements to contrast and visibility. The critical wavelength indicated by line 1405 provides significant color-shift when located near 614 nm, which corresponds to the peak indicated by line 1206 (FIG. 12) of the R-G color-opponent response curve 1201 (FIG. 12). The color-shift results from the suppression of wavelengths between line 1404 and line 1405. This attenuation is applied to an area of the visible light spectrum 1406 to exploit the relative differences between the R-G color-opponent response curve 1201 (FIG. 12) and the B-Y response curve 1202 (FIG. 12).

In one embodiment of the apparatus the local attenuation is applied to wavelengths between 580 nm at line 1404 and 614 nm at line 1405, where the local attenuation indicated by line 1402 is nearly 99 percent, yielding a 1 percent transmittance. And in this embodiment the global attenuation of wavelengths above the critical wavelength indicated by line 1405 yields a transmittance of approximately 81 percent, and the global attenuation of wavelengths below 1404 yields an average transmittance of approximately 25 percent.

Figure 15A:
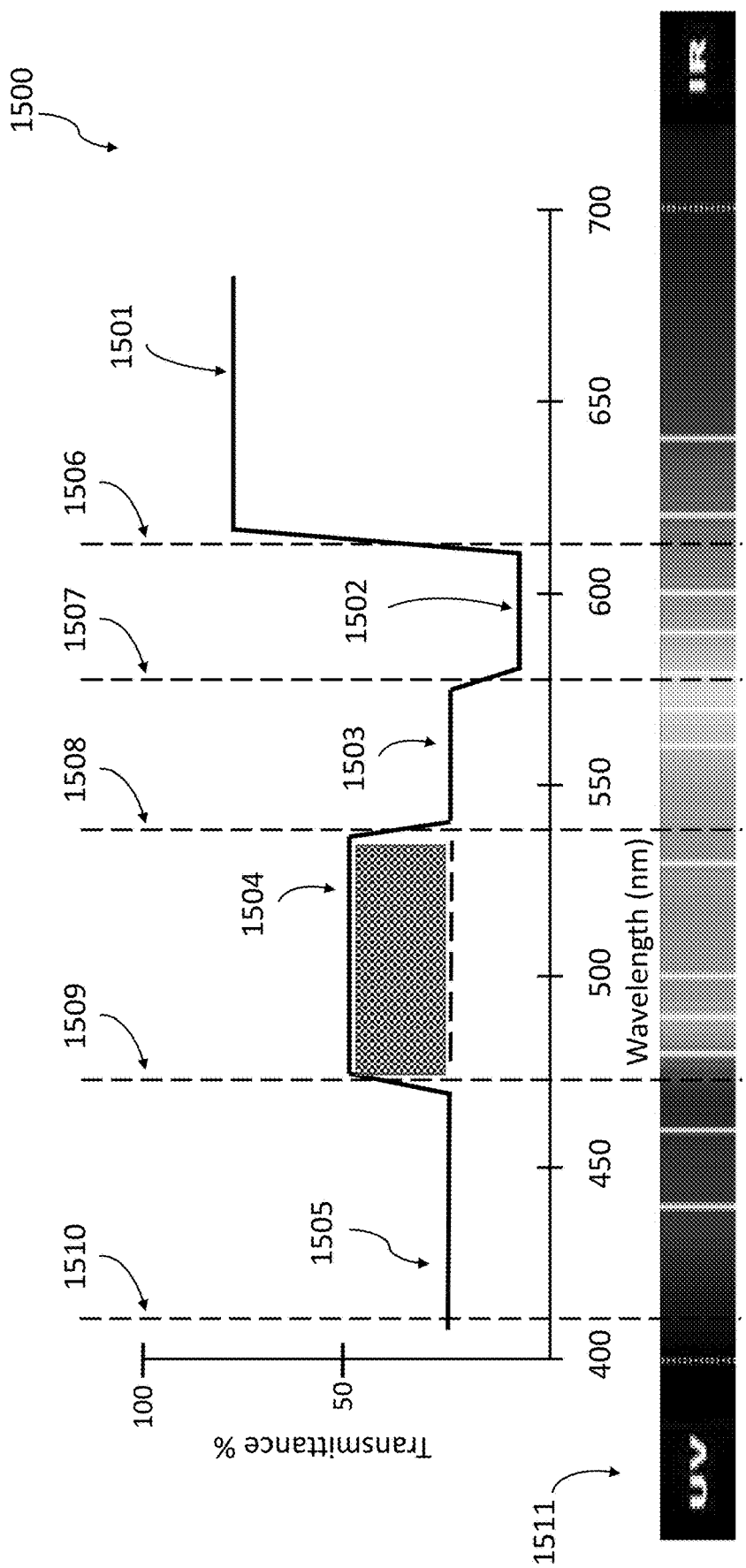
FIG. 15A is a graph illustrating global, local, and color-balance attenuations applied for shotgun shooting applications involving orange clay discs.

FIG. 15A illustrates a composite spectral profile created from a of a set of attenuations that are applied to the visible light spectrum 1511; as configured for shooting applications involving orange clay discs. This set consists of global, local, and color-balance attenuations that are described as follows. First the global attenuations are indicated by line 1501, line 1503, and line 1505. Line 1501 applies to wavelengths above the critical wavelength that is indicated by line 1506. Line 1503 is a global attenuation that applies to wavelengths between line 1508 and line 1507. Line 1505 is a global attenuation that applies to wavelengths between line 1510 and line 1509. Second is the local attenuation indicated by line 1502 that is applied to wavelengths between line 1507 and line 1506. And third is a color-balance attenuation indicated by line 1504 that is applied to wavelengths between line 1509 and line 1508. The purpose of the color-balance attenuation is to provide a natural and seemingly unaltered background scene. In one embodiment, the composite spectral profile for shooting applications that involve orange clay discs can be described as follows. First the global attenuation indicated by line 1501 has a corresponding average transmittance of approximately 81 percent for wavelengths above a critical wavelength near 614 nm as indicated by line 1506. This embodiment includes a global attenuation indicated by line 1505 with a corresponding average transmittance of approximately 25 percent for wavelengths between approximately 400 nm as indicated by line 1510 and 465 nm indicated by line 1509. This embodiment includes a global attenuation indicated by line 1503 with a corresponding average transmittance of approximately 25 percent for wavelengths between approximately 540 nm indicated by line 1508 and 580 nm indicated by line 1507. Second is a local attenuation indicated by line 1502 located between approximately 580 nm indicated by 1507 and a critical wavelength near 614 nm indicated by line 1506. And third is a color-balance attenuation indicated by line 1504 with a corresponding average transmittance of approximately 45 percent that is applied to wavelengths between approximately 465 nm indicated by line 1509 and 540 nm indicated by line 1508.

Figure 15B:
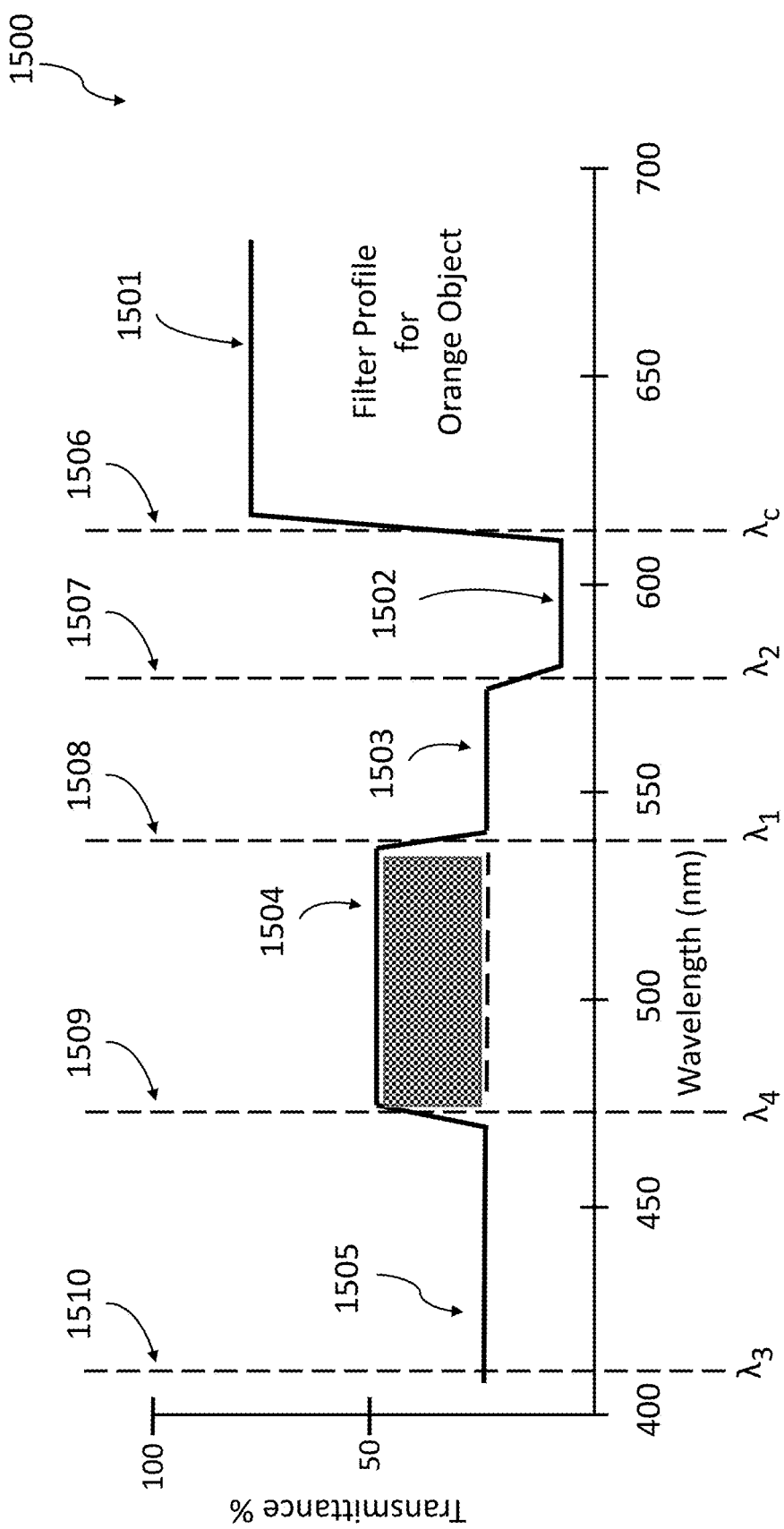
FIG. 15B is a graph illustrating global, local, and color-balance attenuations applied for shotgun shooting applications involving orange clay discs showing specific wavelengths.

FIG. 15B illustrates a composite spectral profile 1500 created from a set of attenuations that are applied to the visible light spectrum as configured for shooting applications involving orange clay discs. Specifically, global attenuation is applied to wavelengths of the visible light spectrum above the critical wavelength $\lambda_c$. Further, global attenuation is applied to the visible light spectrum between wavelengths $\lambda_1$ and $\lambda_2$. As shown by lines 1501 and 1503, the transmittance above the critical wavelength $\lambda_c$ is greater than the transmittance between wavelengths $\lambda_1$ and $\lambda_2$. Also, global attenuation is applied to the visible light spectrum between wavelengths $\lambda_3$ and $\lambda_4$. As shown by lines 1505, 1501 and 1503, the transmittance between wavelengths $\lambda 3$ and $\lambda_4$ is substantially equal to the transmittance between wavelengths $\lambda_1$ and $\lambda_2$, but the transmittance between $\lambda_3$ and $\lambda_4$ is less than the transmittance for wavelengths above the critical wavelength $\lambda_c$. Additionally, local attenuation is applied to wavelengths of the visible light spectrum between wavelengths $\lambda_2$ and $\lambda_c$, which are above the wavelengths $\lambda_1$ and $\lambda_2$ but below the critical wavelength $\lambda_c$. As shown by line 1502, the transmittance between $\lambda_2$ and $\lambda_c$ is less than the transmittance between wavelengths $\lambda_1$ and $\lambda_2$ and the transmittance above the critical wavelength $\lambda_c$.

In addition, color-balance attenuation is applied to wavelengths of the visible light spectrum between $\lambda_4$ and $\lambda_1$, which is below wavelength $\lambda_1$ and above wavelength $\lambda_4$. As shown by lines 1504, 1501 and 1505, the transmittance between wavelengths $\lambda_4$ and $\lambda_1$ is above the transmittance between wavelengths $\lambda_3$ and $\lambda_4$, wavelengths $\lambda_1$ and $\lambda_2$, wavelengths $\lambda_2$ and $\lambda_c$ but below the transmittance above the critical wavelength $\lambda_c$.

FIG. 16A illustrates a composite spectral profile created from a of a set of attenuations that are applied to the visible light spectrum 1614; as configured for blood-trailing applications. This set consists of global, local, and color-balance attenuations that are described as follows. First the global attenuations are indicated by line 1601 and line 1603. Line 1601 applies to wavelengths above the critical wavelength that is indicated by line 1608. Line 1603 is a global attenuation that applies to wavelengths between line 1610 and line 1609. Second is the local attenuation indicated by line 1602 that is applied to wavelengths between line 1609 and line 1608. And third this embodiment includes a color-balance attenuation that is indicated by line 1605 and line 1604. Line 1605 applies to wavelengths between line 1613 and line 1611. Line 1604 applies to wavelengths between line 1611 and line 1610. The purpose of the color-balance attenuation is to provide a natural and seemingly unaltered background scene. However, the color-balance for blood-trailing applications has a twist because it should accommodate use in low-light conditions such as nighttime game recovery with limited light from an artificial source (flashlight, lantern). Low-light scenarios require the filter to transmit additional light to keep the color photoreceptors (cones) properly engaged. This is accomplished by relaxing the attenuation of wavelengths between line 1613 and line 1611 to allow more light to come thru the optical filter. The shaded area 1606 represents the color-balance attenuation applied for orange clay discs; while the shaded area 1607 represents the relaxation required to transmit more light in order to optimize the effectiveness of the color photoreceptors (cones). In one embodiment the composite spectral profile for shooting applications involving orange clay discs can be described as follows. First the global attenuation indicated by line 1601 has a corresponding average transmittance of approximately 81 percent for wavelengths above a critical wavelength near 614 nm as indicated by line 1608. This embodiment includes a global attenuation indicated by line 1603 with a corresponding average transmittance of approximately 25 percent for wavelengths between approximately 540 nm indicated by line 1610 and 580 nm indicated by line 1609. Second is a local attenuation 1602 with a corresponding average transmittance of 1 percent as applied to wavelengths between approximately 580 nm indicated by 1609 and a critical wavelength near 614 nm indicated by line 1608. And third this embodiment includes a color-balance attenuation indicated by line 1605 and line 1604. The color-balance attenuation indicated by line 1605 has a corresponding average transmittance of approximately 99 percent that is applied to wavelengths between approximately 400 nm indicated by line 1613 and 505 nm indicated by line 1611. The color-balance attenuation indicated by line 1604 has a corresponding average transmittance of approximately 45 percent that is applied to wavelengths between approximately 505 nm as indicated by line 1611 and 540 nm indicated by line 1610.

Figure 16B:
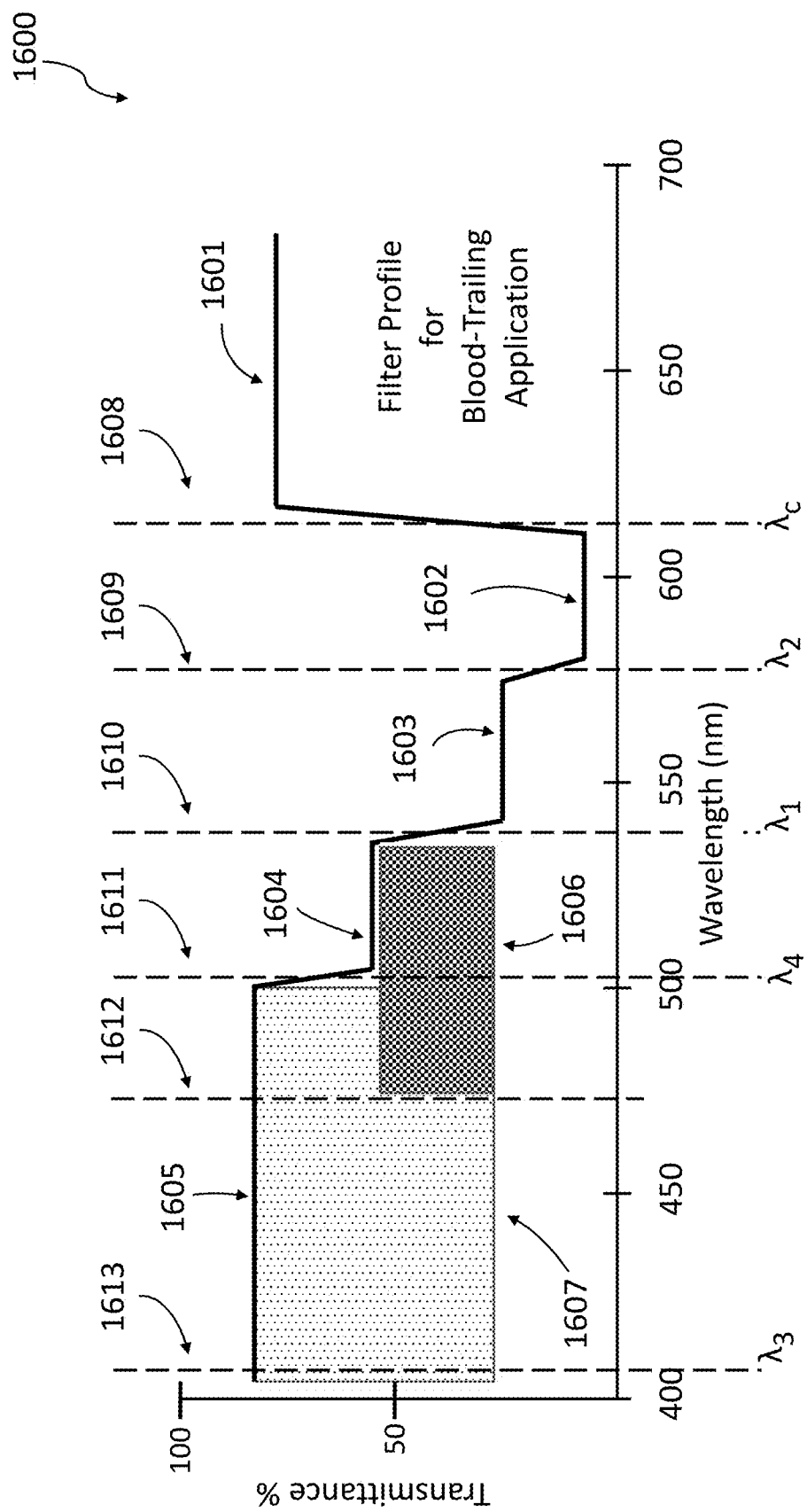
FIG. 16B is a graph illustrating global, local, and color-balance attenuations applied for blood-trailing applications showing specific wavelengths.

FIG. 16B illustrates a composite spectral profile created from a set of attenuations that are applied to the visible light spectrum; as configured for blood-trailing applications.

Specifically, global attenuation is applied to wavelengths of the visible light spectrum above the critical wavelength $\lambda_c$. Further, global attenuation is applied to the visible light spectrum between wavelengths $\lambda_1$ and $\lambda_2$, which are below the critical wavelength $\lambda_c$. As shown by lines 1601 and 1603, the transmittance above the critical wavelength $\lambda_c$ is greater than the transmittance between wavelengths $\lambda_1$ and $\lambda_2$.

Additionally, local attenuation is applied to wavelengths of the visible light spectrum between wavelengths $\lambda_2$ and $\lambda_c$, which are above the wavelengths $\lambda_1$ and $\lambda_2$ but below the critical wavelength $\lambda_c$. As shown by line 1602, the transmittance between wavelengths $\lambda_2$ and $\lambda_c$ is less than the transmittance between wavelengths $\lambda_1$ and $\lambda_2$ and the transmittance of wavelengths above the critical wavelength $\lambda_c$.

In addition, color-balance attenuation is applied to wavelengths of the visible light spectrum. In this regard, color-balance attenuation is applied between wavelengths $\lambda_3$ and A and between wavelengths $\lambda_2$ and $\lambda_c$, both of which are below wavelength $\lambda_1$. As shown by lines 1605, the transmittance between wavelengths $\lambda_3$ and $\lambda_4$ is above the transmittance between wavelengths $\lambda_4$ and $\lambda_1$, wavelengths $\lambda_2$ and $\lambda_c$, and wavelengths $\lambda_1$ and $\lambda_2$. Note that in one embodiment, transmittance between wavelengths $\lambda_3$ and $\lambda_4$ may be slightly above, equal to, or less than the transmittance above the critical wavelength $\lambda_c$. As shown by line 1604, the transmittance between wavelengths $\lambda_4$ and $\lambda_1$ is below the transmittance between wavelengths $\lambda_3$ and $\lambda_4$ and below the transmittance above the critical wavelength $\lambda_c$. However, the transmittance between wavelengths $\lambda_4$ and $\lambda_1$ is above the transmittance between wavelengths $\lambda_1$ and $\lambda_2$ and between wavelengths $\lambda_2$ and $\lambda_c$.

Figure 17:
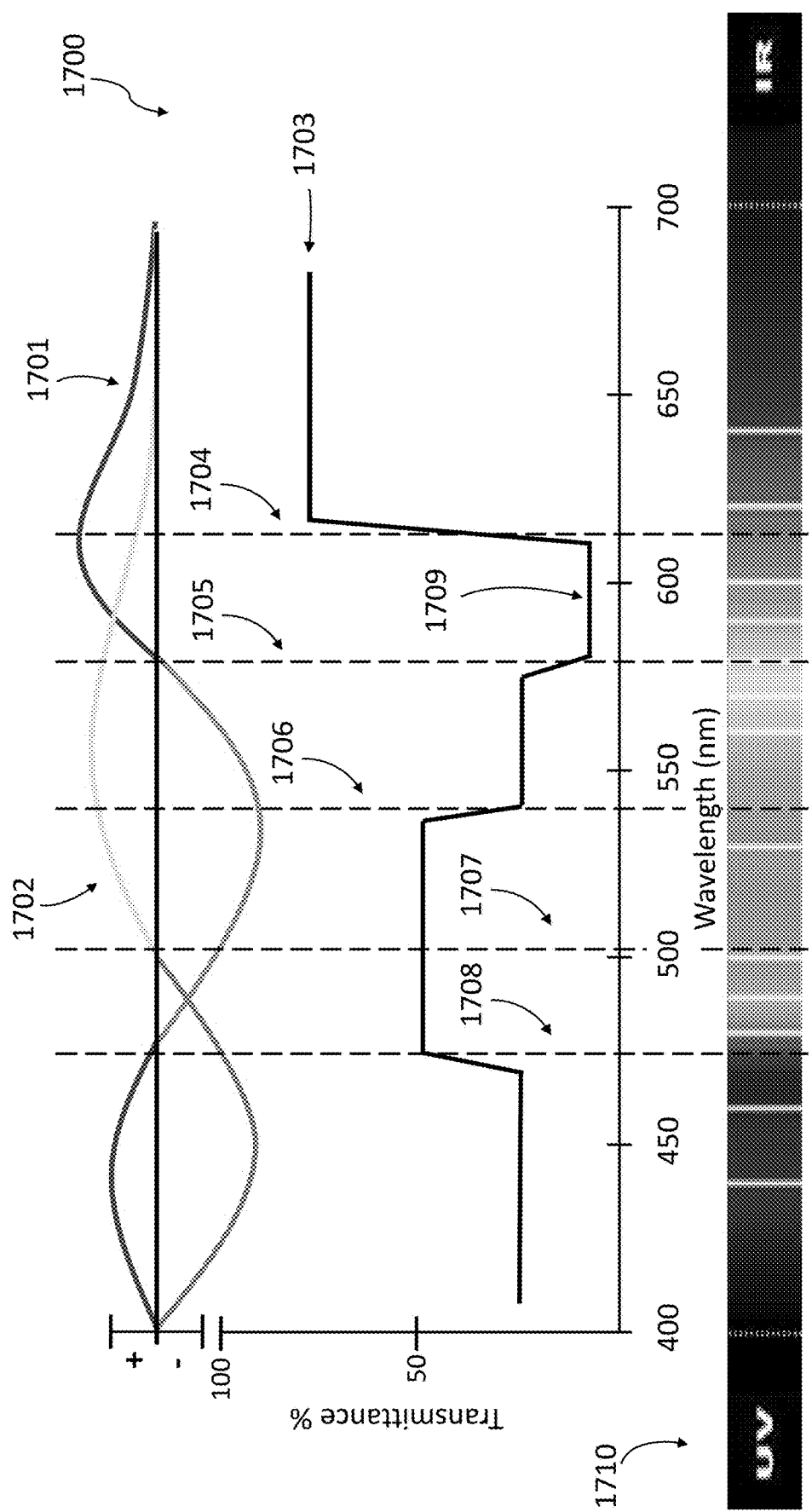
FIG. 17 combines graphs of the color opponent response curves with a graph of the composite spectral profile of the filtering apparatus as optimized for shotgun shooting applications with orange clay discs.

FIG. 17 combines the color opponent response curves (R-G curve 1701 and B-Y curve 1702) with the composite spectral profile indicated by line 1703 of the apparatus 100 as tailored for shooting applications with orange clay discs. The transitions of line 1704, line 1705, line 1706, line 1707, and line 1708 of the composite spectral profile 1703 correspond to peaks and zero-crossings of the color opponent response curves. For example, the upper critical wavelength indicated by line 1704 for the local attenuation indicated by line 1709 aligns with the peak of the R-G color opponent response curve 1701, where the R-G color opponent response dominates the B-Y response curve 1702. A color-shift effect results from the local attenuation of wavelengths between line 1705 and line 1704. The visible light spectrum 1710 is included for reference.

Figure 18:
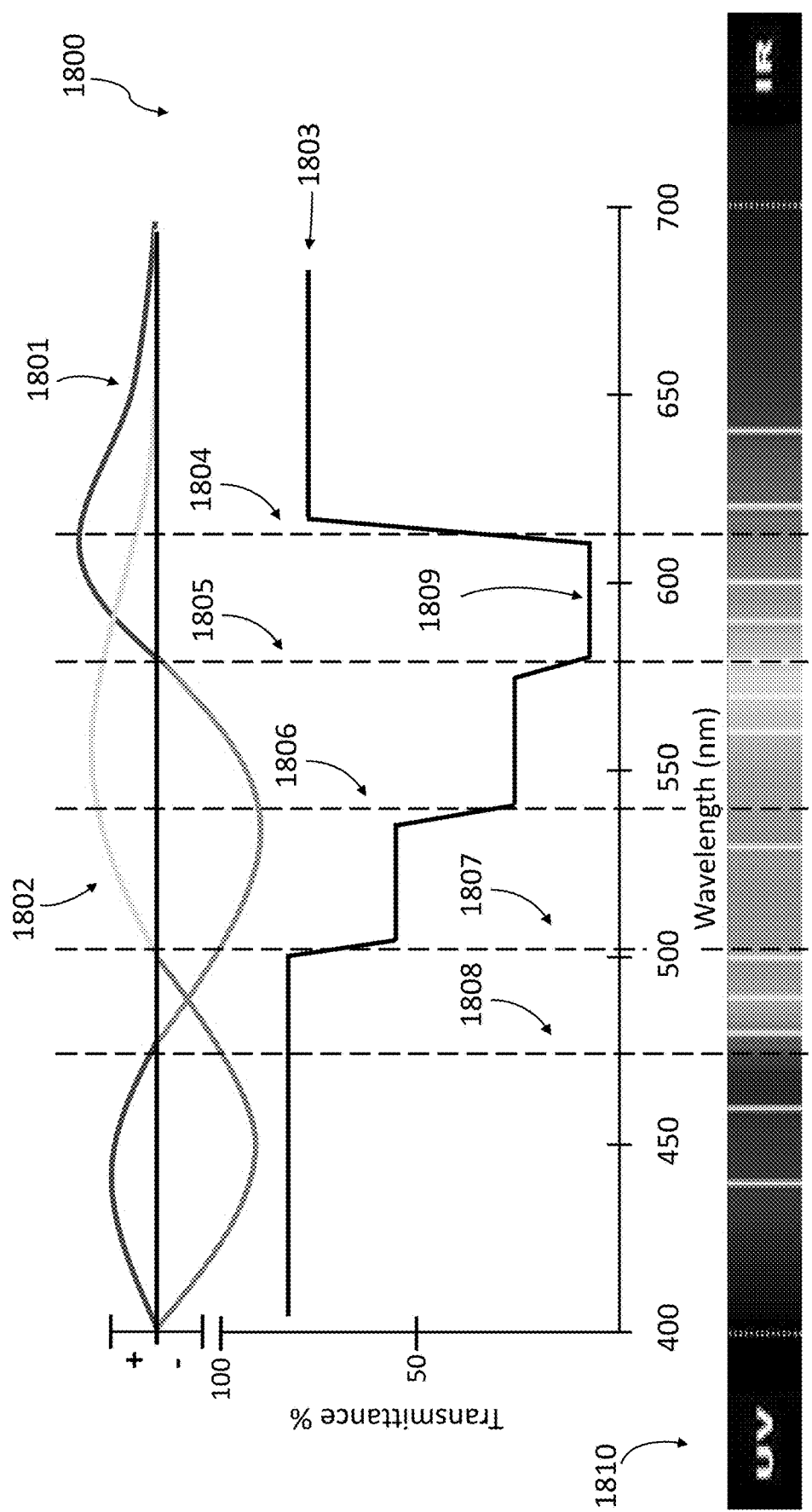
FIG. 18 combines graphs of the color opponent response curves with a graph of the composite spectral profile of the filtering apparatus as optimized for blood-trailing applications.

FIG. 18 combines the color opponent response curves (R-G curve 1801 and B-Y curve 1802) with the composite spectral profile indicated by line 1803 of the apparatus 100 as tailored for blood-trailing applications. The transitions indicated by line 1804, line 1805, line 1806, line 1807, and line 1808 of the composite spectral profile 1803 correspond to peaks and zero-crossings of the color opponent response curves. For example, the upper critical wavelength indicated by line 1804 for the local attenuation indicated by line 1809 aligns with the peak of the R-G color opponent response curve 1801 where the R-G curve 1801 color opponent response dominates the B-Y response curve 1802. A color-shift effect results from the local attenuation of wavelengths between line 1805 and line 1804. The visible light spectrum 1810 is included for reference.

Light absorbing materials are used in the construction of the lens(es). Lenses can be constructed using a variety of materials such as glass and plastics. The lenses can incorporate light absorbing materials, and these materials can be incorporated externally such as coatings and films. The materials can be incorporated internally such as dyes, pigments, and rare earth minerals. These light absorbing materials generally provide either wide-band or narrow-band filtration.

In one embodiment, the spectral filtering of the eyewear is accomplished via the meticulous combination of light absorbing dyes (or pigments) with polycarbonate materials (plastics). This is referred to as color-compounding, and the resulting compound is used to form the lenses of the glasses. Combinations of narrow-band and wide-band absorbers allow the creation of custom spectrums for the filtered light. The various wavelengths of the filtered light can receive predictable attenuations across the spectrum. These attenuations can vary from slight to significant based on the dye selections and relative concentrations. In one embodiment, combinations of these dyes allow the creation of a filtered spectrum that mimics the spectrum of blood. This filtered spectrum has similar shape, proportions, and wavelength transitions as that of blood.

In another embodiment, rare earth elements may also be mixed in with polycarbonate (or glass) as the lens(es) of the eyewear are being manufactured. Additional coatings or features can be applied to the glasses and include anti-scratch, anti-fog, anti-reflection, anti-glare, and polarization.

Custom interference filters may also be applied to the lens(es) externally via vapor deposition and active ion-sputtering. However, interference filters do not provide the same performance as color-compounding. The interference filters instead block bands of wavelengths producing a binary effect where the wavelengths are either fully passed or blocked, with no variations in the amplitude of the filtered light.

Wide-band absorbers are typically inexpensive but do not offer the necessary performance by themselves. Companies like Rosco provide wide-band filters like their Roscolux™ that use special dyes to provide color filtration. Narrow-band absorbers are by comparison more expensive. Companies like Epolin use special dyes to provide narrow-band color filtration. These narrow-band absorbers can provide extremely sharp notch filtration where wide-band absorbers cannot. These narrow-band absorbers also provide filtration that do not in many cases extend into the red wavelength areas.

Figure 19:
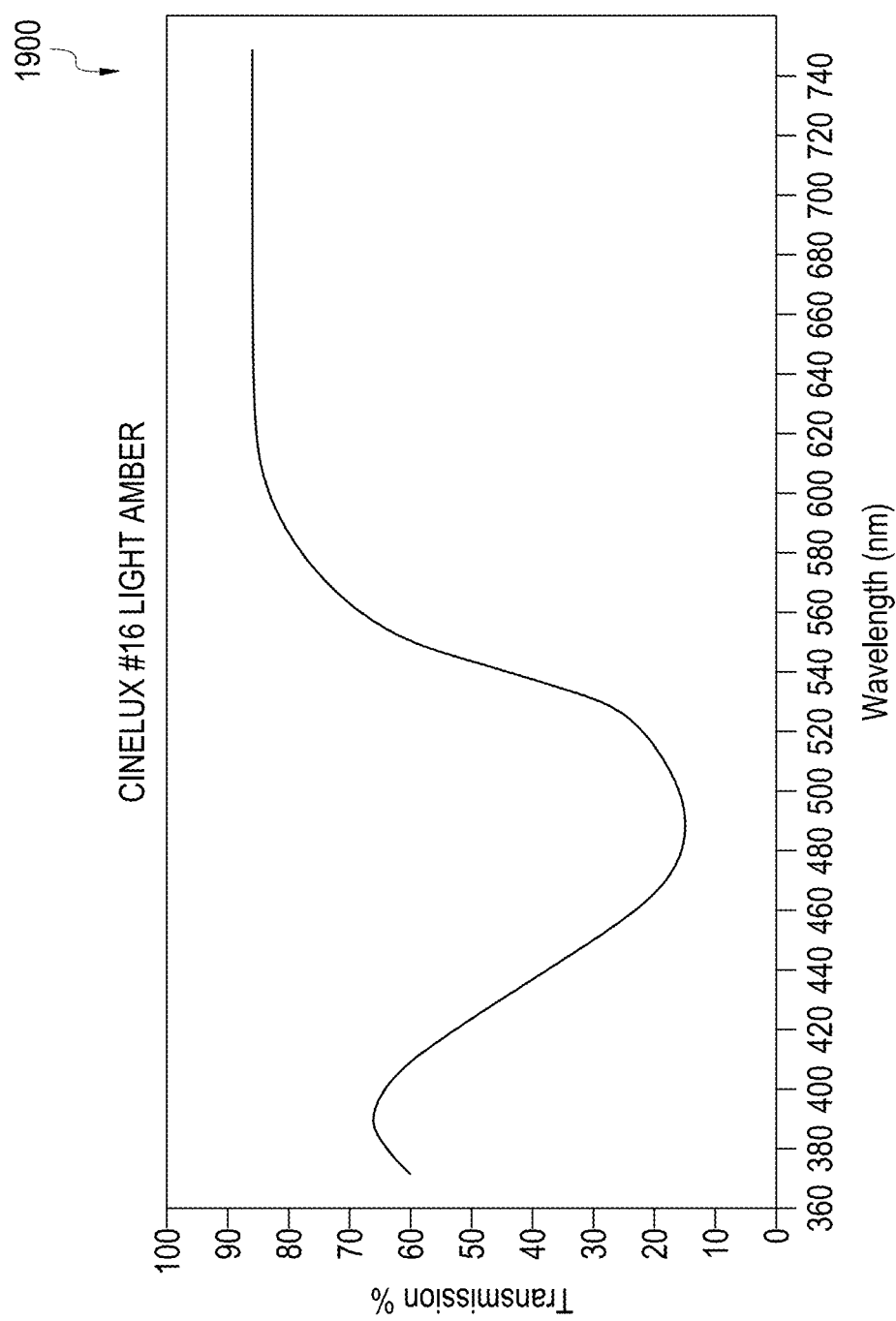
FIG. 19 is a graph of the spectral response transmittance for a wide-band absorber (Cinelux #16 Light Amber).

FIG. 19 provides a graph 1900 that shows the transmittance of a wide-band absorber (Cinelux #16 Light Amber). This type absorber is not able to provide sharp notches and is not able to provide significant optical densities as compared to narrow-band absorbers.

Figure 20:
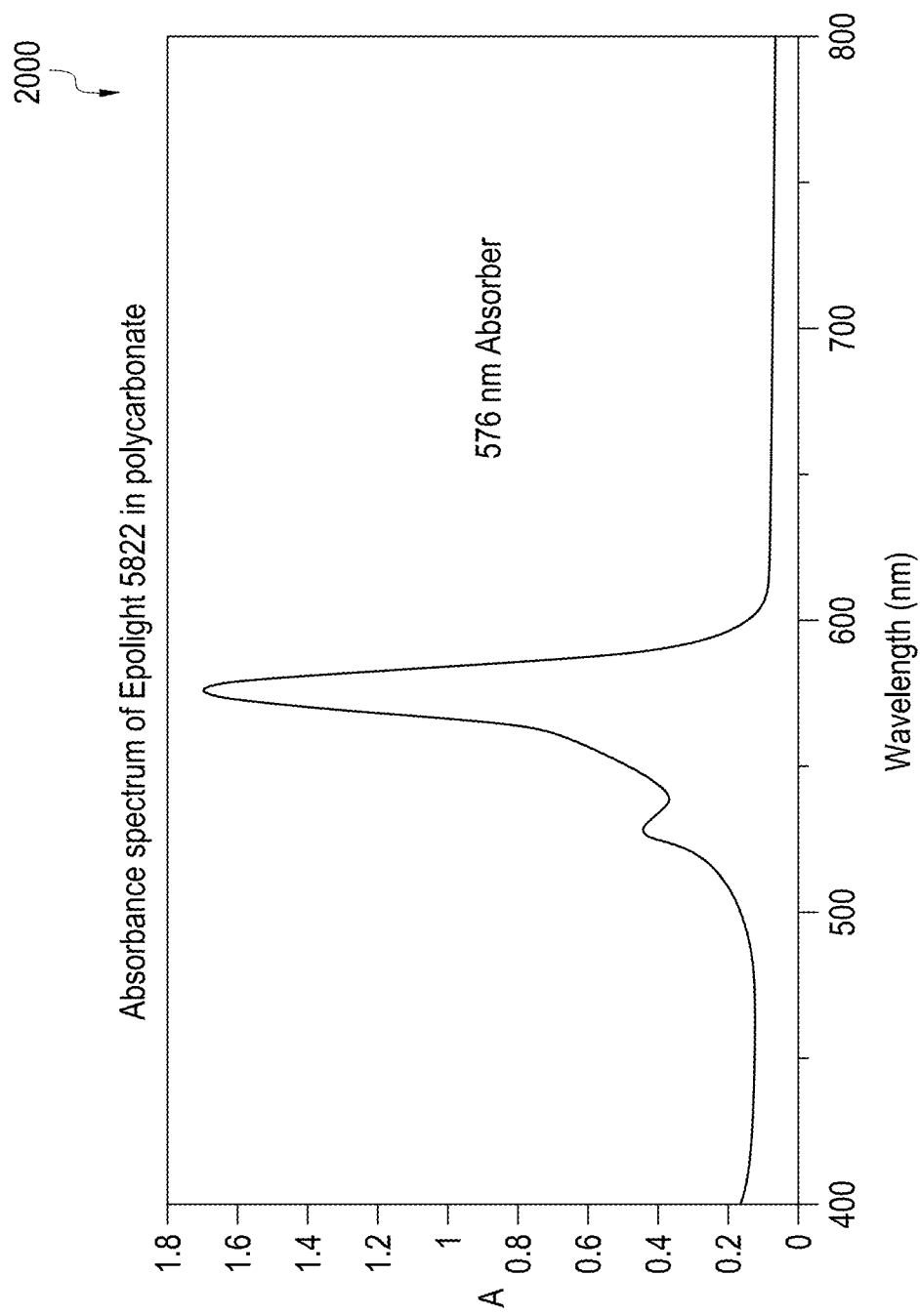
FIG. 20 is a graph of the spectral absorbance for a narrow-band absorber (Epolight 5822) with peak absorbance near 576 nm.

FIG. 20 provides a graph 2000 that shows the transmittance of a narrow-band absorber (Epolight 5822) with peak absorbance near 576 nm. This absorber is able to provide a sharp notch and keep the transmittance up around 80% in the red wavelength area.

Figure 21:
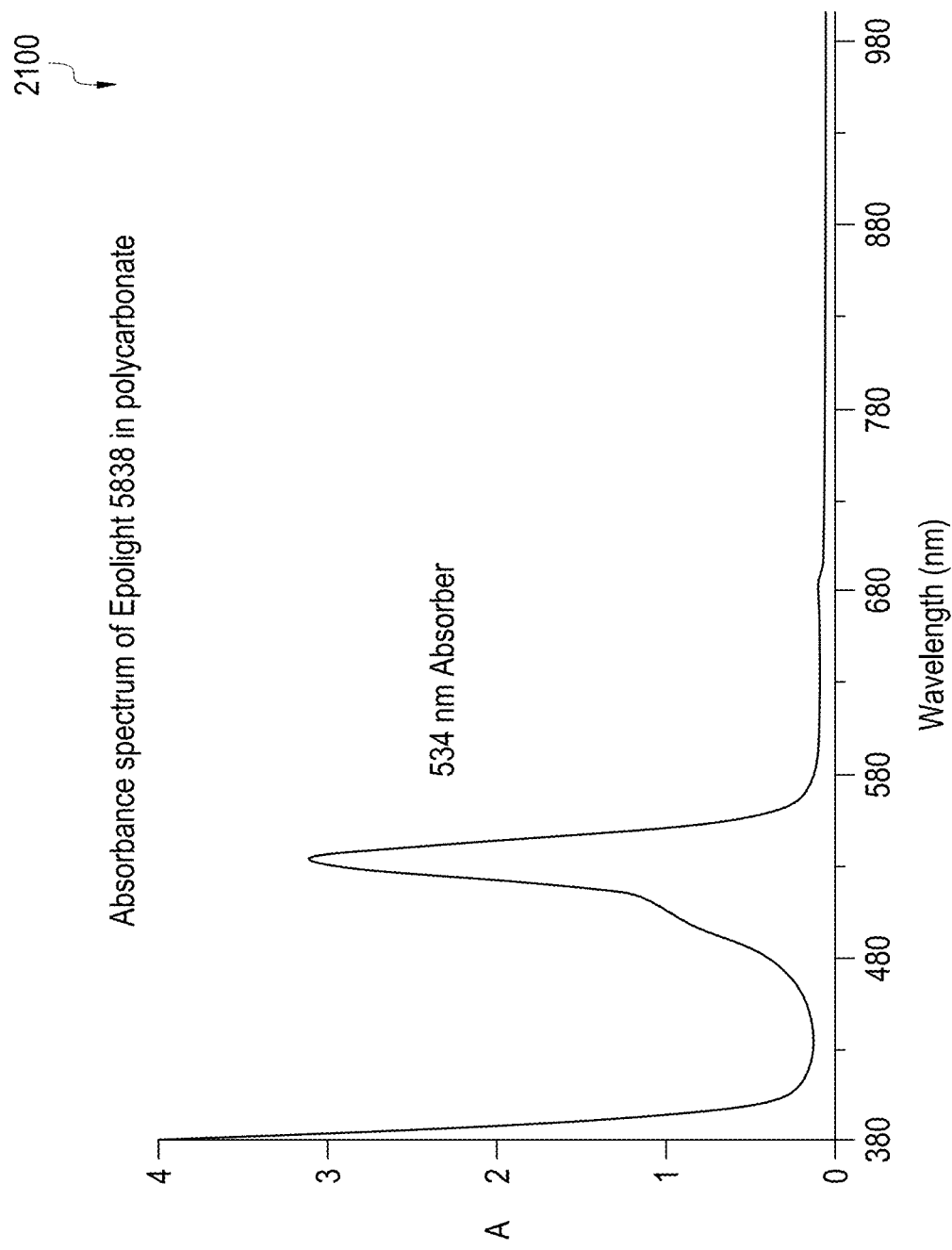
FIG. 21 is a graph of the spectral absorbance for a narrow-band absorber (Epolight 5838) with peak absorbance near 534 nm.

FIG. 21 provides a graph 2100 that shows the transmittance of a narrow-band absorber (Epolight 5838) with peak absorbance near 534 nm.

Figure 22:
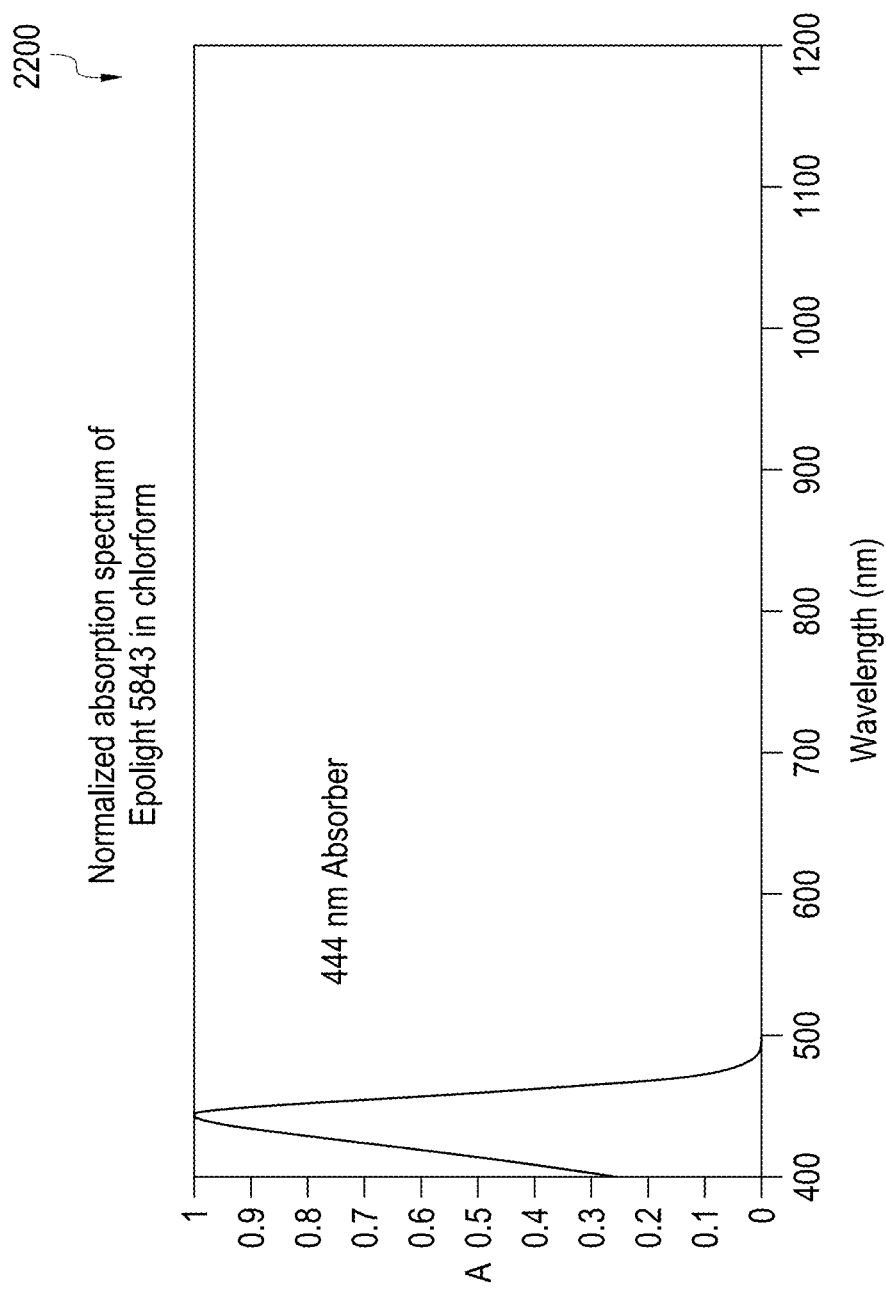
FIG. 22 is a graph of the spectral absorbance for a narrow-band absorber (Epolight 5843) with peak absorbance near 444 nm.

FIG. 22 provides a graph 2200 that shows the transmittance of a narrow-band absorber (Epolight 5843) with peak absorbance near 444 nm.

Figure 23:
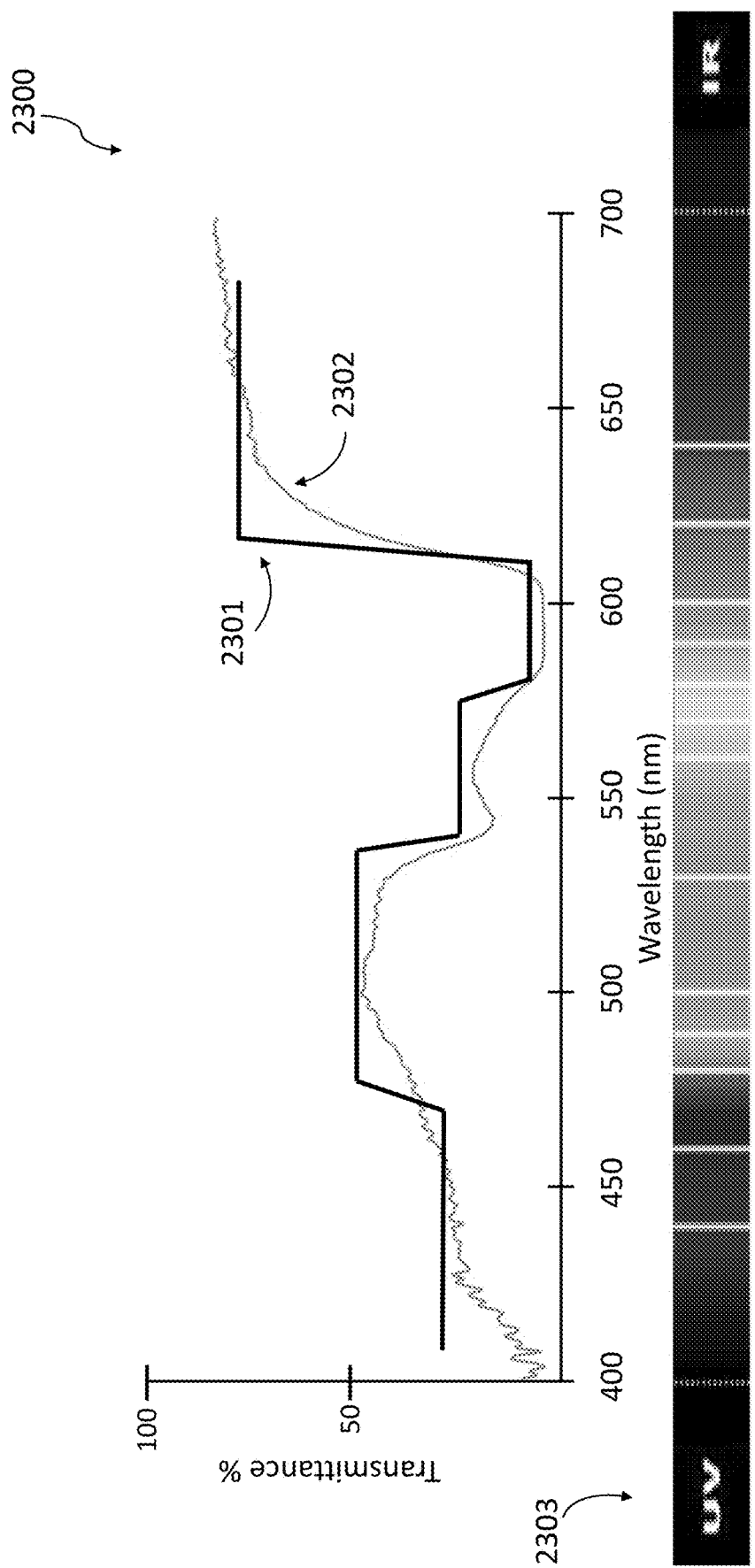
FIG. 23 illustrates the theoretical and practical transmittance curves for the exemplary eyewear depicted in FIG. 1 as configured for shooting applications involving orange clay discs.

FIG. 23 shows the transmission percentage of light of the exemplary eyewear 100 as applied to shooting applications with orange clay discs (targets). This figure overlays the transmittance of the proposed attenuations 2301 and the actual transmittance 2302 of a color-compounded lens produced using narrow-band absorbers in polycarbonate. The visible light spectrum 2303 is included for reference.

Figure 24:
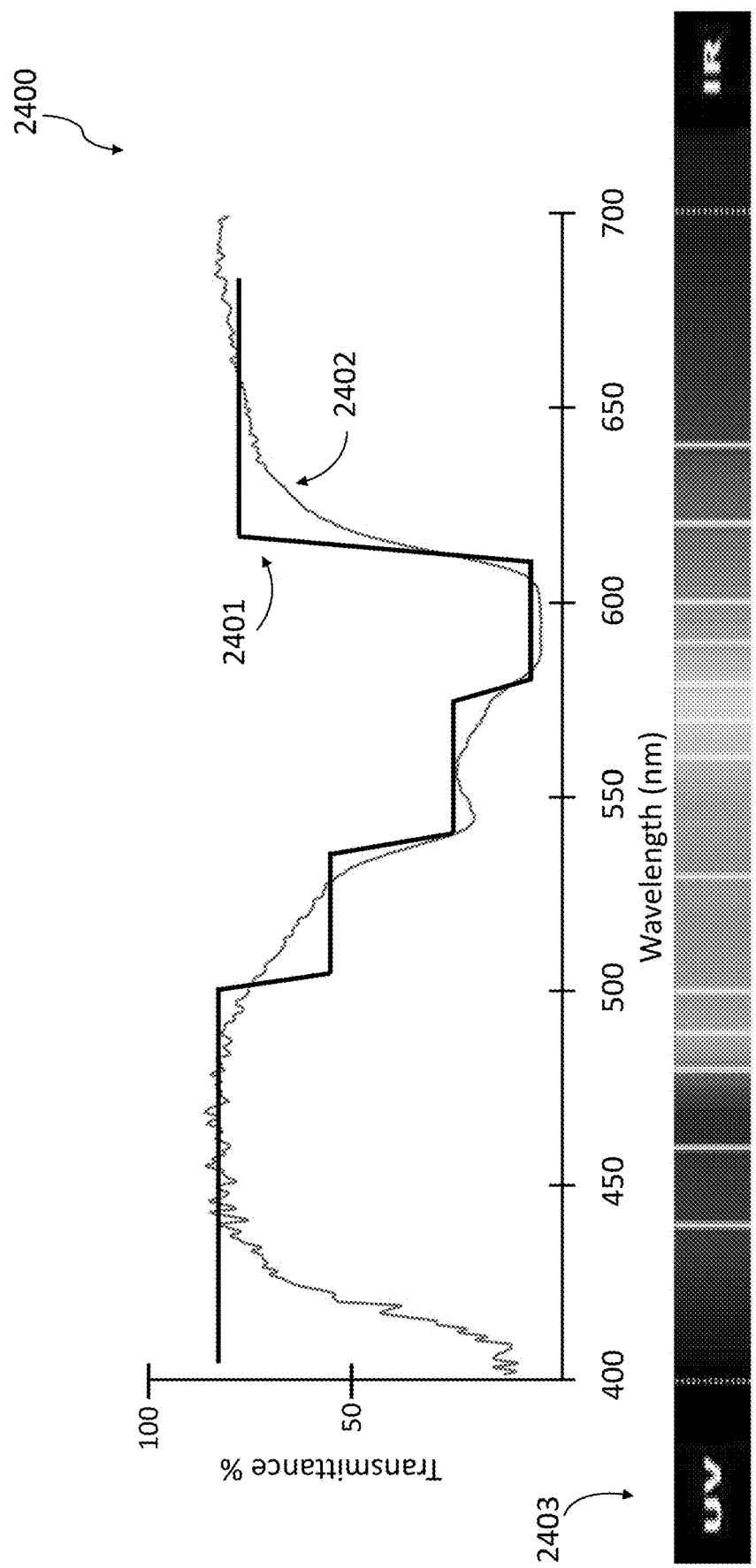
FIG. 24 illustrates the theoretical and practical transmittance curves for the exemplary eyewear depicted in FIG. 1 as configured for blood-trailing applications.

FIG. 24 shows the transmission percentage of light of the exemplary eyewear 100 as applied to blood trailing applications. This figure overlays the transmittance of the proposed attenuations 2401 and the actual transmittance 2402 of a color-compounded lens produced using narrow-band absorbers in polycarbonate. The visible light spectrum 2403 is included for reference.

As described above and shown in the associated drawings, the present invention comprises an optical filtering eyewear apparatus. While particular embodiments have been described, it will be understood, however, that any invention appertaining to the apparatus described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What I claim is:

1. Eyewear for increasing visibility of a color, comprising:
   a lens configured for viewing a specific object having specific wavelength characteristics; and
   a filter formed in the lens and configured for applying global attenuation, local attenuation, and color-balance attenuation to the visible light spectrum to identify objects of a specific color, the filter configured for:
   a. globally attenuating the visible light spectrum between approximately 400 nanometers (nm) and approximately 505 nm to an average transmittance of approximately 99%, between approximately 540 nm and approximately 580 nm to an average transmittance of approximately 25%, and between approximately 614 nm and approximately 700 nm to an average transmittance of approximately 81%:
   b. attenuating significantly less than all other wavelengths of the visible light above approximately 614 nm to an average transmittance of approximately 81% which is characteristic of red visible light;
   c. locally attenuating the visible light spectrum between approximately 580 nm and approximately 614 nm to an average transmittance of approximately 1%;
   d. color-balance attenuating the visible light spectrum between approximately 505 nm and approximately 540 nm to an average transmittance of approximately 45%.

2. They eyewear of claim 1, wherein global attenuation is applied to all visible wavelengths.

3. The eyewear of claim 2, wherein global attenuation is applied to wavelengths of the visible light spectrum above a critical wavelength and to wavelengths between a first wavelength and a second wavelength that are below the critical wavelength and transmittance between the first wavelength and the second wavelength is less than the transmittance above the critical wavelength.

4. The eyewear of claim 3, wherein local attenuation is applied to wavelengths of the visible light spectrum between the second wavelength and the critical wavelength that are above the first wavelength and the second wavelength and below the critical wavelength and transmittance between the second wavelength and the critical wavelength is less than the transmittance between the first wavelength and the second wavelength and less than the transmittance above the critical wavelength.

5. The eyewear of claim 4, wherein color-balance attenuation is applied to wavelengths below the first wavelength.

6. The eyewear of claim 5, wherein color-balance attenuation is applied to wavelengths between a third wavelength and a fourth wavelength and to wavelengths between the fourth wavelength and the first wavelength and both are below the first wavelength, and transmittance between the fourth wavelength and the first wavelength is greater than the transmittance between the first wavelength and the second wavelength and between the second wavelength and the critical wavelength but less than the transmittance above the critical wavelength, and transmittance between the third wavelength and the fourth wavelength is greater than the transmittance between the fourth wavelength and the first wavelength and between the first wavelength and the second wavelength and between the second wavelength and the critical wavelength, and the transmittance between the third and fourth wavelength is above, equal to, or less than the transmittance above the critical wavelength.

7. The eyewear of claim 1, wherein the filter comprises the red transmittance region at 620-750 nanometers (nm) and a blue-green transmittance region at approximately 450 nm and 550 nm that is less than the red transmittance region at 620 nm and 750 nm.

8. The eyewear of claim 7, wherein the filter is configured to transmit the red transmittance region at approximately 620 nm-750 nm and the blue-green transmittance region at approximately 540-440 while globally attenuating the red transmittance at approximately nm 620-750 nm and the green transmittance at approximately 480 nm-540 nm, and the red transmittance region is greater than the green transmittance region.

9. The eyewear of claim 8, wherein the filter is configured for locally attenuating an orange transmittance region at approximately 585 nm-620 nm and the orange transmittance region is less than the red transmittance region at approximately 620 nm-75- nm and the green transmittance region at approximately 495-570.

10. The eyewear of claim 9, wherein the filter is configured for color-balance attenuating a blue-green transmittance region at approximately 450 nm-570 nm and a portion of the blue-green transmittance region is greater than the red transmittance region at approximately 520 nm-750 nm and a portion of the blue-green transmittance region is less than the red transmittance region.

11. The eyewear of claim 1, wherein global attenuation is applied to all visible wavelengths and additional color-balance attenuation is applied to the visible light spectrum between approximately 465 nm to approximately 505 nm to an average transmittance of approximately 45%, and between approximately 400 nm and approximately 465 nm to an average transmittance of approximately 25%.

12. The eyewear of claim 11, wherein global attenuation is applied to wavelengths of the visible light spectrum above a critical wavelength and to wavelengths between a first wavelength and a second wavelength that are below the critical wavelength and to wavelengths between a third wavelength and a fourth wavelength that are below the first wavelength and transmittance between the first wavelength and the second wavelength is less than transmittance above the critical wavelength and substantially equal to transmittance between the third wavelength and the fourth wavelength.

13. The eyewear of claim 12, wherein local attenuation is applied to wavelengths of the visible light spectrum between the second wavelength and the critical wavelength that are above the first wavelength and the second wavelength and below the critical wavelength and transmittance between the second wavelength and the critical wavelength is less than the transmittance above the critical wavelength and the transmittance between the first wavelength and the second wavelength and the transmittance between the third wavelength and the fourth wavelength.

14. The eyewear of claim 13, wherein color-balance attenuation is applied to wavelengths below the first wavelength.

15. The eyewear of claim 14, wherein color-balance attenuation is applied to wavelengths between the fourth wavelength and the first wavelength that are below the first wavelength and above the fourth wavelength and transmittance between the fourth wavelength and the first wavelength is less than the transmittance above the critical wavelength and greater than the transmittance between the first wavelength and the second wavelength and the third wavelength and the fourth wavelength.

16. The eyewear of claim 1, wherein the filter is configured for transmitting a red transmittance region at 620-750 and a blue-green transmittance region at approximately 450 nm-570 nm and globally attenuating the predominantly red transmittance region at approximately 620 nm-750 nm and a yellow-green transmittance region at approximately 570 nm-590 nm and the blue-green transmittance region is less than the red transmittance region.

17. The eyewear of claim 16, wherein the filter is configured for locally attenuating an orange transmittance region at approximately 590 nm-620 nm and the orange transmittance region is less than the red transmittance region at approximately 620 nm-750 nm.

18. The eyewear of claim 17, wherein the filter is configured for color-balance attenuating a blue-green transmittance at approximately 450 nm-550 nm region and the blue-green transmittance region is less than the red transmittance region at approximately 650 nm-750 nm but greater than a blue-purple transmittance region at approximately 380 nm-450 nm, a yellow-green transmittance region at approximately 495 nm-590 nm, and the orange transmittance region at approximately 590 nm-620 nm.

19. The eyewear of claim 1, wherein the filter is configured for providing anti-scratch characteristics, anti-fog characteristics, anti-reflection characteristics, anti-glare characteristics, and polarization characteristics.

20. The eyewear of claim 1, wherein the filter is configured for providing additional attenuation to ultraviolet (UV) light wavelengths at or below 400 nm to protect the human eye.

* * * * *